United States Patent
Ippatapu et al.

(10) Patent No.: US 11,231,867 B1
(45) Date of Patent: Jan. 25, 2022

(54) DATA REPLICATION USING DEDUPLICATION AND SYNCHRONIZED HASH TABLES

(71) Applicant: EMC IP Holding Company LLC, Hopkinton, MA (US)

(72) Inventors: Venkata L R Ippatapu, Westborough, MA (US); Kenneth Dorman, West Brookfield, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/879,813

(22) Filed: Jan. 25, 2018

(51) Int. Cl.
*G06F 3/06* (2006.01)
*G06F 12/1018* (2016.01)

(52) U.S. Cl.
CPC ............ *G06F 3/065* (2013.01); *G06F 3/067* (2013.01); *G06F 3/0619* (2013.01); *G06F 3/0641* (2013.01); *G06F 3/0656* (2013.01); *G06F 3/0659* (2013.01); *G06F 3/0688* (2013.01); *G06F 12/1018* (2013.01)

(58) Field of Classification Search
CPC ...... G06F 3/065; G06F 3/0619; G06F 3/0641; G06F 3/0656; G06F 3/0659; G06F 3/067; G06F 3/0688; G06F 12/1018
See application file for complete search history.

(56) References Cited

U.S. PATENT DOCUMENTS

| | | | |
|---|---|---|---|
| 5,544,347 A | 8/1996 | Yanai et al. | |
| 5,742,792 A | 4/1998 | Yanai et al. | |
| 6,968,369 B2 | 11/2005 | Veprinsky et al. | |
| 7,054,883 B2 | 5/2006 | Meiri et al. | |
| 8,082,231 B1 | 12/2011 | McDaniel et al. | |
| 8,996,800 B2* | 3/2015 | Venkatesh | G06F 12/128 711/113 |
| 9,852,076 B1* | 12/2017 | Garg | G06F 16/172 |
| 2012/0084518 A1* | 4/2012 | Vijayan | G06F 11/1453 711/162 |

(Continued)

OTHER PUBLICATIONS

Screen shot of the term position from a Meriam Webster defintion captured on archive.org. (Year: 2016).*

(Continued)

*Primary Examiner* — William E. Baughman
*Assistant Examiner* — Janice M. Girouard
(74) *Attorney, Agent, or Firm* — Muirhead and Saturnelli, LLC

(57) ABSTRACT

Techniques for processing write operations may include: receiving, at a first data storage system, a first write operation that writes first data to a first device, wherein the first device is configured for replication on a second device of a second data storage system; performing first processing that determines whether the first data written by the first write operation is a duplicate of an existing entry in a first hash table of the first data storage system; responsive to determining the first data written by the first write operation is a duplicate of an existing entry in the first hash table, performing second processing; responsive to determining the first data written by the first write operation is unique and is not a duplicate of an existing entry in the first hash table, performing third processing; and transmitting the final buffer to the second data storage system.

20 Claims, 17 Drawing Sheets

(56) References Cited

U.S. PATENT DOCUMENTS

2014/0149666 A1* 5/2014 Nakagawa ............ G06F 3/0605
                                                                711/114
2017/0031945 A1* 2/2017 Sarab .................. G06F 16/1748

OTHER PUBLICATIONS

P.F. Windley, et al., "Binary search tree," Retrieved from https://en.wikipedia.org/w/index.php?title=Binary_search_tree&oldid=801134990, Sep. 17, 2017.

Venkata L. R. Ippatapu, et al., U.S. Appl. No. 15/728,758, filed Oct. 10, 2017, "Host Data Replication Using Deduplication and Binary Search Trees".

* cited by examiner

Hash table storing IO1 and IO2 on the remote (R2) data storage system 226

DATA REPLICATION USING DEDUPLICATION AND SYNCHRONIZED HASH TABLES

BACKGROUND

Technical Field

This application generally relates to data storage and more particularly to techniques used in connection with data deduplication and data replication.

Description of Related Art

Computer systems may include different resources used by one or more host processors. Resources and host processors in a computer system may be interconnected by one or more communication connections. These resources may include, for example, data storage devices such as those included in the data storage systems manufactured by Dell Inc. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data storage systems, hosts and other components may be interconnected by one or more communication connections such as in a network configuration. The network may support transmissions in accordance with well-known protocols such as TCP/IP (Transmission Control Protocol/Internet Protocol), UDP (User Datagram Protocol), and the like. Networked storage systems, such as data storage arrays, may be used to maintain data on different systems in different locations. Such mirroring may be used for a variety of reasons including reducing the likelihood of data loss. For example, in some implementations, a primary or source data site, such as a first or primary data storage system, may be configured in a partner relationship with a second or remote data storage system whereby the second data storage system includes a mirror or copy of data of one or more devices of the first data storage system.

SUMMARY OF THE INVENTION

In accordance with one aspect of techniques herein is a method of processing write operations comprising: receiving, at a first data storage system, a first write operation that writes first data to a first device, wherein the first device is configured for replication on a second device of a second data storage system; performing first processing that determines whether the first data written by the first write operation is a duplicate of an existing entry in a first hash table of the first data storage system; responsive to determining the first data written by the first write operation is a duplicate of an existing entry in the first hash table, performing second processing comprising: preparing a final buffer including information used by the second data storage system in replicating the first write operation on the second device of the second data storage system, wherein the final buffer includes first metadata identifying the existing entry of the first hash table that is a duplicate of the first data of the first write operation; responsive to determining the first data written by the first write operation is unique and is not a duplicate of an existing entry in the first hash table, performing third processing comprising: inserting, into the first hash table, a first new entry that stores the first data written by the first write operation; and preparing the final buffer including information used by the second data storage system in replicating the first write operation on the second device of the second data storage system, wherein the final buffer includes second metadata used by the second data storage system in creating another new entry in a second hash table on the second data storage system, wherein the another new entry corresponds to the first new entry of the first hash table of the first data storage system; and transmitting the final buffer from the first data storage system to the second data storage system. The first processing may include: computing a first hash value for the first data written by the first write operation; computing a first hash index for the first hash value; and determining whether the first hash index of the first hash table has the existing entry that is a duplicate of the first data written by the first write operation. The step of determining whether the first hash index of the first hash table has the existing entry that is a duplicate of the first data written by the first write operation may include: comparing the first hash value to another hash value of the existing entry; and responsive to the first hash value matching the another hash value, determining the existing entry is a duplicate of the first data written by the first write operation. The first data of the first write operation may be a duplicate and the final buffer may include the first metadata, that identifies the existing entry of the first hash table that is a duplicate of the first data of the first write operation. The first metadata may include a data type indicating the first write operation is a duplicate, the first hash index of the existing entry, and a first collision value of the existing entry, wherein the first hash index and the first collision value may be used on the second data storage system to uniquely identify an existing corresponding entry of the second hash table of the second data storage system that includes the first data of the first write operation. The final buffer may not include the first data written by the first write operation. The first data of the first write operation may be unique and may not be a duplicate of an existing entry in the first hash table. The third processing may insert the first new entry in a list of one or more entries associated with the first hash index, and wherein the first new entry may have a first collision value identifying a position of the first entry on the list. The second metadata of the final buffer may include a data type indicating the first write operation is unique and is not a duplicate, the first hash index, and the first collision value, and the final buffer may include the first data written by the first write operation. The second data storage system may insert the another new entry in the second hash table of the second data storage system. The another new entry may be included in a list of one or more entries associated with the first hash index in the second hash table, and wherein the another new entry may have the first collision value. The first device may be configured for synchronous replication on a second device of the second data storage system. The first device may be configured for asynchronous replication on a second device of the second data storage system. The method may include: writing the first data to the first device of the first data storage system; and upon receiving the final buffer on the second data storage system, performing processing to use information of the final buffer to write the first data on the second device of the second data storage system.

In accordance with another aspect of techniques herein is a system comprising: one or more processors; and a memory comprising code stored thereon that, when executed, performs a method of processing write operations comprising: receiving, at a first data storage system, a first write operation that writes first data to a first device, wherein the first device is configured for replication on a second device of a second data storage system; performing first processing that determines whether the first data written by the first write operation is a duplicate of an existing entry in a first hash table of the first data storage system; responsive to determining the first data written by the first write operation is a duplicate of an existing entry in the first hash table, performing second processing comprising: preparing a final buffer including information used by the second data storage system in replicating the first write operation on the second device of the second data storage system, wherein the final buffer includes first metadata identifying the existing entry of the first hash table that is a duplicate of the first data of the first write operation; responsive to determining the first data written by the first write operation is unique and is not a duplicate of an existing entry in the first hash table, performing third processing comprising: inserting, into the first hash table, a first new entry that stores the first data written by the first write operation; and preparing the final buffer including information used by the second data storage system in replicating the first write operation on the second device of the second data storage system, wherein the final buffer includes second metadata used by the second data storage system in creating another new entry in a second hash table on the second data storage system, wherein the another new entry corresponds to the first new entry of the first hash table of the first data storage system; and transmitting the final buffer from the first data storage system to the second data storage system.

In accordance with another aspect of techniques herein is a computer readable medium comprising code stored thereon that performs a method of processing write operations comprising: receiving, at a first data storage system, a first write operation that writes first data to a first device, wherein the first device is configured for replication on a second device of a second data storage system; performing first processing that determines whether the first data written by the first write operation is a duplicate of an existing entry in a first hash table of the first data storage system; responsive to determining the first data written by the first write operation is a duplicate of an existing entry in the first hash table, performing second processing comprising: preparing a final buffer including information used by the second data storage system in replicating the first write operation on the second device of the second data storage system, wherein the final buffer includes first metadata identifying the existing entry of the first hash table that is a duplicate of the first data of the first write operation; responsive to determining the first data written by the first write operation is unique and is not a duplicate of an existing entry in the first hash table, performing third processing comprising: inserting, into the first hash table, a first new entry that stores the first data written by the first write operation; and preparing the final buffer including information used by the second data storage system in replicating the first write operation on the second device of the second data storage system, wherein the final buffer includes second metadata used by the second data storage system in creating another new entry in a second hash table on the second data storage system, wherein the another new entry corresponds to the first new entry of the first hash table of the first data storage system; and transmitting the final buffer from the first data storage system to the second data storage system. The first processing may include: computing a first hash value for the first data written by the first write operation; computing a first hash index for the first hash value; and determining whether the first hash index of the first hash table has the existing entry that is a duplicate of the first data written by the first write operation. The step of determining whether the first hash index of the first hash table has the existing entry that is a duplicate of the first data written by the first write operation may include: comparing the first hash value to another hash value of the existing entry; and responsive to the first hash value matching the another hash value, determining the existing entry is a duplicate of the first data written by the first write operation. The first data of the first write operation may be a duplicate and the final buffer may include the first metadata, that identifies the existing entry of the first hash table that is a duplicate of the first data of the first write operation, wherein the first metadata may include a data type indicating the first write operation is a duplicate, the first hash index of the existing entry, and a first collision value of the existing entry. The first hash index and the first collision value may be used on the second data storage system to uniquely identify an existing corresponding entry of the second hash table of the second data storage system that includes the first data of the first write operation. The final buffer may not include the first data written by the first write operation. The first data of the first write operation may be unique and not a duplicate of an existing entry in the first hash table. The third processing may insert the first new entry in a list of one or more entries associated with the first hash index, and wherein the first new entry may have a first collision value identifying a position of the first entry on the list. The second metadata of the final buffer may include a data type indicating the first write operation is unique and is not a duplicate, the first hash index, and the first collision value, and the final buffer may include the first data written by the first write operation. The second data storage system may insert the another new entry in the second hash table of the second data storage system. The another new entry may be included in a list of one or more entries associated with the first hash index in the second hash table, and wherein the another new entry may have the first collision value.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
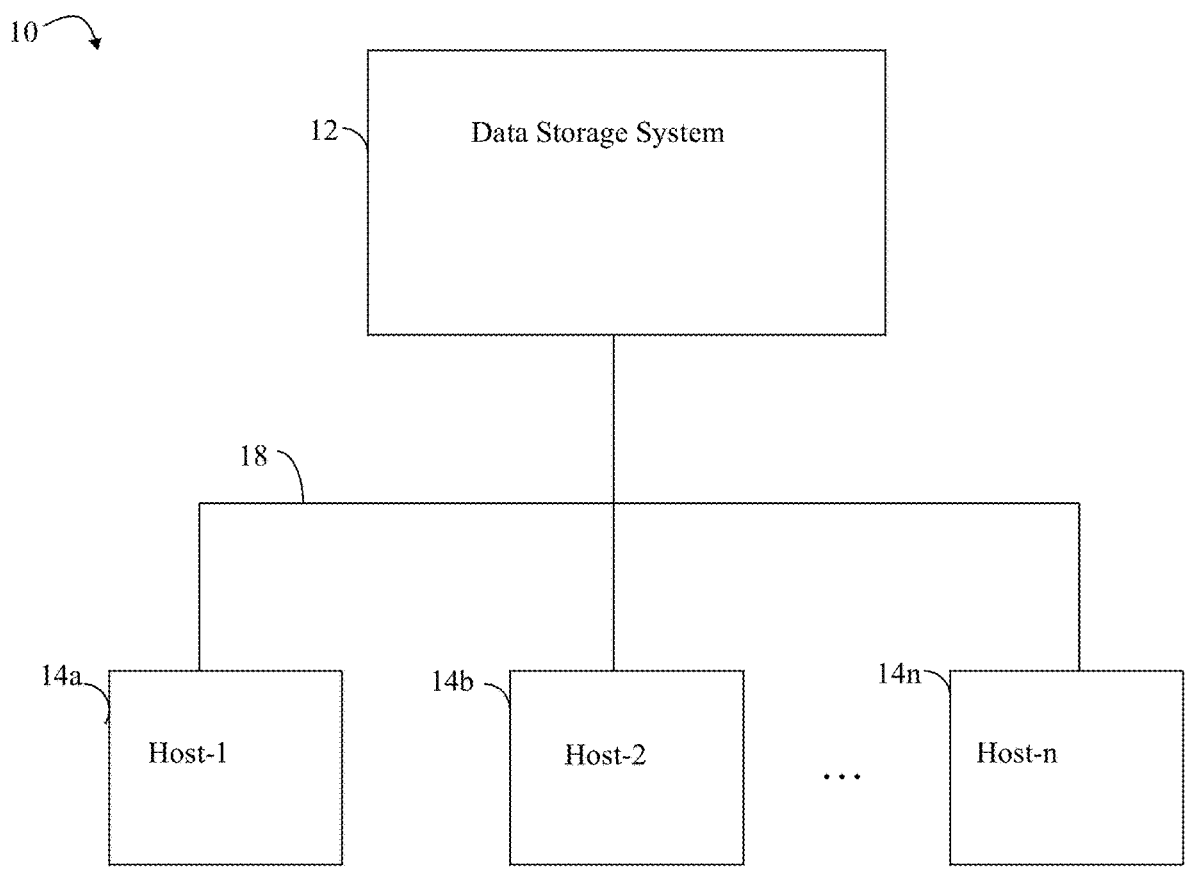
FIG. 1 is an example of an embodiment of a computer system that may utilize the techniques described herein.

Referring now to FIG. 1, shown is an example of an embodiment of a system that may be used in performing the techniques described herein. The system 10 includes a data storage system 12 connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, ESCON, Fibre Channel, iSCSI, or GIGE (Gigabit Ethernet), and the like. Some or all of the connections by which the hosts and data storage system 12 may be connected to the communication medium 18 may pass through other communication devices, such as switching equipment, a phone line, a repeater, a multiplexer or even a satellite.

Each of the host computer systems may perform different types of data operations in accordance with different tasks and applications executing on the hosts. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
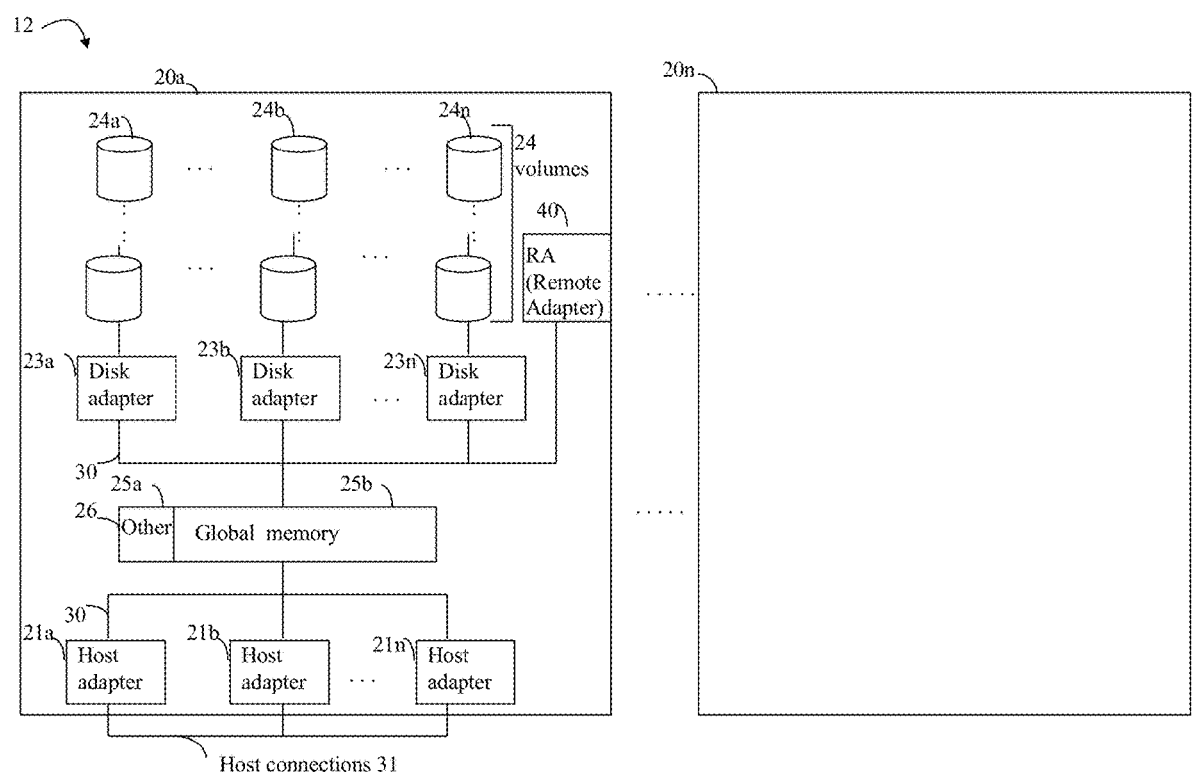
FIG. 2A is an example of an embodiment of a data storage system.

Referring now to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems.

Each of the data storage systems, such as 20a, may include a plurality of data storage devices (e.g., physical non-volatile storage devices), such as disk devices or volumes, in an exemplary arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

Also shown in the storage system 20*a* is an RA or remote adapter 40. The RA may be hardware including a processor used to facilitate communication between data storage systems, such as between two of the same or different types of data storage systems. In one embodiment described in more detail in following paragraphs and figures, the RAs of the different data storage systems may communicate over a Gigabit Ethernet or Fibre Channel transmission channel supporting messaging traffic between data storage systems. The RA may be hardware including a processor used to facilitate communication between data storage systems, such as between two Symmetrix® data storage systems. The RA may be used with the Symmetrix Remote Data Facility (SRDF®) products provided by Dell Inc. SRDF® is a family of products that facilitates the data replication from one Symmetrix® storage array to another through a Storage Area Network (SAN) or and IP network. SRDF® logically pairs a device or a group of devices from each array and replicates data from one to the other synchronously or asynchronously. Generally, the SRDF® products are one example of commercially available products that may be used to provide functionality of a remote data facility (RDF) for use in an embodiment in connection with techniques herein.

One or more internal logical communication paths may exist between the DA's, the RA's, the HA's, and the memory 26. An embodiment, for example, may use one or more internal busses and/or communication modules. For example, the global memory portion 25*b* may be used to facilitate data transfers and other communications between the DA's, HA's and RA's in a data storage system. In one embodiment, the DAs 23*a*-23*n* may perform data operations using a cache that may be included in the global memory 25*b*, for example, in communications with other disk adapters or directors, and other components of the system 20*a*. The other portion 25*a* is that portion of memory that may be used in connection with other designations that may vary in accordance with each embodiment.

It should be generally noted that the elements 24*a*-24*n* denoting data storage devices may be any suitable storage device such as a rotating disk drive, flash-based storage, and the like. The particular data storage system as described in this embodiment, or a particular device thereof, such as a rotating disk or solid state storage device (e.g., a flash-based storage device), should not be construed as a limitation. Other types of commercially available data storage systems, as well as processors and hardware controlling access to these particular devices, may also be included in an embodiment.

In at least one embodiment, write data received at the data storage system from a host or other client may be initially written to cache memory (e.g., such as may be included in the component designated as 25*b*) and marked as write pending. Once written to cache, the host may be notified that the write operation has completed. At a later point time, the write data may be destaged from cache to the physical storage device, such as by a DA.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices, logical volumes or logical units (LUNs). The LUNs may or may not correspond to the actual disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

Figure 2B:
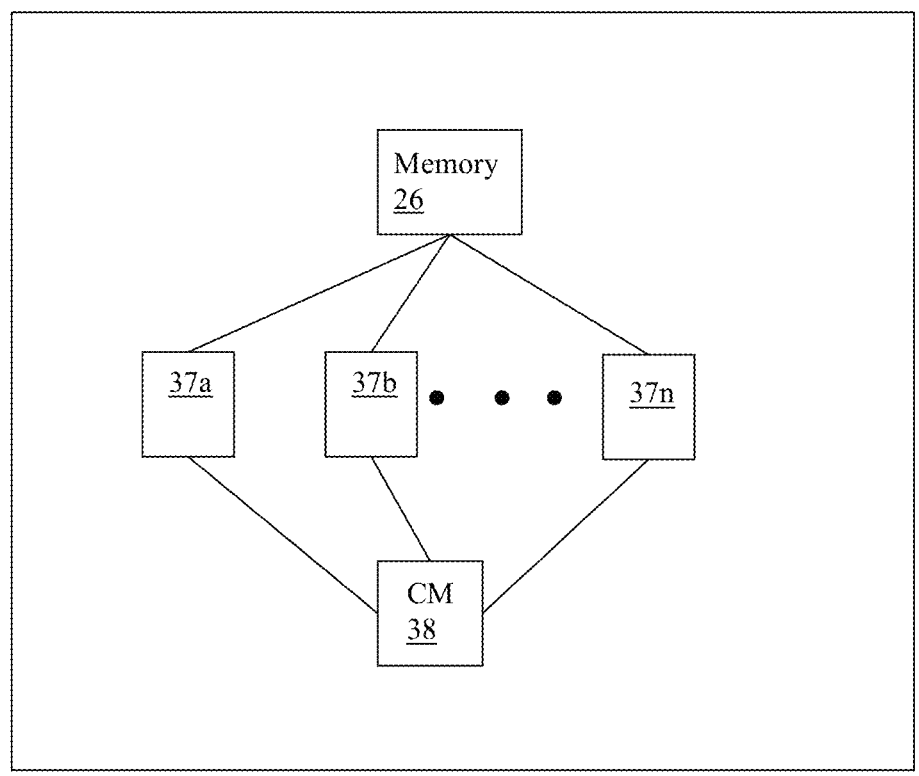
FIG. 2B is a representation of the logical internal communications between the directors and memory included in one embodiment of the data storage system of FIG. 2A.

Referring to FIG. 2B, shown is a representation of the logical internal communications between the directors and memory included in a data storage system. Included in FIG. 2B is a plurality of directors 37*a*-37*n* coupled to the memory 26. Each of the directors 37*a*-37*n* represents one of the HA's, RA's, or DA's that may be included in a data storage system. In an embodiment disclosed herein, there may be up to sixteen directors coupled to the memory 26. Other embodiments may use a higher or lower maximum number of directors that may vary. The representation of FIG. 2B also includes an optional communication module (CM) 38 that provides an alternative communication path between the directors 37*a*-37*n*. Each of the directors 37*a*-37*n* may be coupled to the CM 38 so that any one of the directors 37*a*-37*n* may send a message and/or data to any other one of the directors 37*a*-37*n* without needing to go through the memory 26. The CM 38 may be implemented using conventional MUX/router technology where a sending one of the directors 37*a*-37*n* provides an appropriate address to cause a message and/or data to be received by an intended receiving one of the directors 37*a*-37*n*. In addition, a sending one of the directors 37*a*-37*n* may be able to broadcast a message to all of the other directors 37*a*-37*n* at the same time.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

Figure 3:
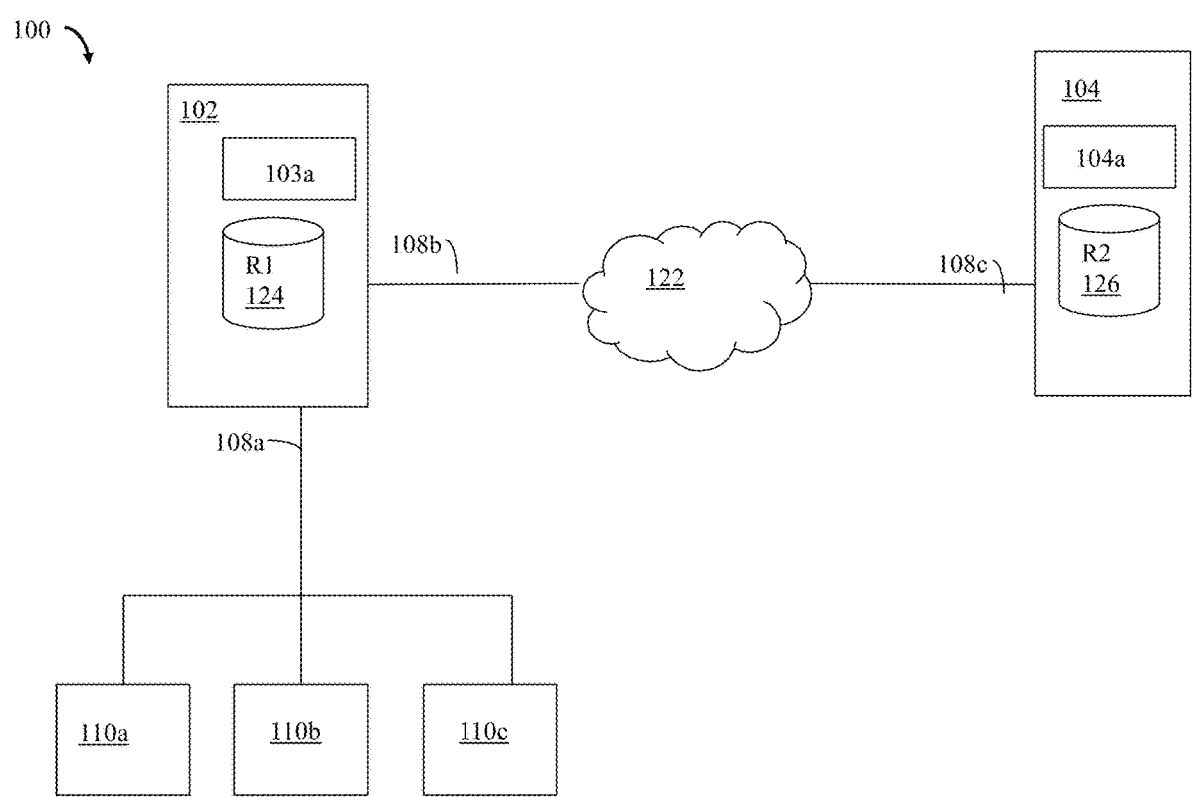
FIGS. 3 and 4 are example representations of components of a system that may be used in connection with the techniques herein.

Referring to FIG. 3, shown is an example of an embodiment of a system 100 that may be used in connection with the techniques described herein. It should be noted that the embodiment illustrated in FIG. 3 presents a simplified view of some of the components illustrated in FIGS. 1 and 2A, for example, including only some detail of the data storage systems 20a through 20n for the sake of illustration.

Included in the system 100 are data storage systems 102 and 104 and hosts 110a, 110b and 110c. The data storage systems 102, 104 may be remotely connected and communicate over network 122, such as the Internet or other private network, and facilitate communications with the components connected thereto. Hosts 110a, 110b and 110c may perform operations to data storage system 102 over connection 108a. The hosts 110a, 110b and 110c may be connected to the data storage system 102 through connection 108a which may be, for example, network or other type of communication connection. Although not illustrated, the hosts 110a-110c may also be directly connected to a network such as the Internet.

The data storage systems 102 and 104 may include one or more devices. In this example, data storage system 102 includes device R1 124, and data storage system 104 includes device R2 126. Both of the data storage systems 102, 104 may include one or more other logical and/or physical devices. Data storage system 102 may be characterized as local with respect to hosts 110a, 110b and 110c. Data storage system 104 may be characterized as remote with respect to hosts 110a, 110b and 110c. For example, in some embodiments in accordance with techniques herein, the distance between the data storage systems 102 and 104 may be 200 km or more.

The host 110a may issue a command, such as to write data to device R1 of data storage system 102. In some instances, it may be desirable to copy data from the storage device R1 to another second storage device, such as R2, provided in a different location so that if a disaster occurs that renders R1 inoperable, the host (or another host) may resume operation using the data of R2. Such a capability is provided, for example, by the SRDF® products provided by Dell Inc. Data storage device communication between Symmetrix™ data storage systems using SRDF® is described, for example, in U.S. Pat. Nos. 5,742,792, 5,544,347, and 7,054,883, all of which are incorporated by reference herein. With SRDF®, a user may denote a first storage device, such as R1, as a master storage device and a second storage device, such as R2, as a slave storage device. Other incarnations of SRDF® may provide a peer to peer relationship between the local and remote storage devices. In this example, the host 110a interacts directly with the device R1 of data storage system 102, but any data changes made are automatically provided to the R2 device of data storage system 104 using SRDF®. In operation, the host 110a may read and write data using the R1 volume in 102, and SRDF® may handle the automatic copying and updating of data from R1 to R2 in data storage system 104.

As illustrated in connection with other figures herein, data storage system 102 may have one or more RAs included therein to facilitate remote connections to the data storage system 104. Communications between storage system 102 and 104 may be made over connections 108b,108c to network 122. Data storage system 104 may include one or more RAs for use in receiving the communications from the data storage system 102. The data storage systems may communicate, for example, over Gigabit Ethernet connections supporting TCP/IP traffic. The SRDF® replication functionality may be facilitated with the RAs provided at each of the data storage systems 102 and 104. Performing remote data communications using SRDF® over a TCP/IP network is described in more detail in U.S. Pat. No. 6,968,369, Nov. 22, 2005, Veprinsky, et al., REMOTE DATA FACILITY OVER AN IP NETWORK, which is incorporated by reference herein. In connection with SRDF®, a single RDF link or path may be between an RA of the system 102 and an RA of the system 104. As described in more detail below, techniques are described for use in transmitting data over an RDF link, such as I/O traffic including write data in connection with performing remote data replication over the RDF link between the systems 102 and 104.

An embodiment may also include the concept of a remote data facility (RDF) group in which one or more devices on a data storage system are associated with a particular group under the control of a single RA which services the devices included therein. Rather than have a single R1 device and a single R2 device, a grouping may be defined so that a source group of devices, such as on data storage system 102, have corresponding target devices of a target group, such as devices on data storage system 104. Devices in a source group may be mirrored in corresponding devices of a target group using SRDF® functionality.

Techniques herein may be used with SRDF®, or more generally any RDF, operating in one or more different supported modes. For example, such modes may include SRDF® operating in synchronous mode, asynchronous mode, or adaptive copy mode. For example, in connection with SRDF®, one of the hosts 110a-c may issue a write to an R1 device in a first data storage system and the data change is propagated to the R2 device in a second data storage system. As discussed in U.S. Pat. No. 5,544,347, SRDF® can be operated in either a synchronous mode or an asynchronous mode. When operating in the synchronous mode, the host does not consider an operation specified by a command chain to be completed until the command chain has been committed to both the first and second data storage systems. Thus, in synchronous mode, the first or source storage system will not provide an indication to the host that the data operation is complete until the first storage system receives an acknowledgement from the second data storage system regarding the data for the R2 device. In contrast, in connection with the asynchronous mode, the host receives an acknowledgement from the first data storage system as soon as the information is committed to the first data storage system without waiting for an acknowledgement from the second data storage system.

In at least one embodiment performing data replication operating in the asynchronous replication mode, an acknowledgement regarding completion of a host write from one of the hosts 110a-c may be sent to the host from the first data storage system 102 once the write data has been written to the data cache 103a on the system 102. Consistent with discussion elsewhere herein, the write data is subsequently destaged from 103a to physical storage provisioned for the R1 device 124. Additionally, the write data is also transferred to the second data storage system 104 where the write data is then written to the data cache 104a, and acknowledgement is returned from system 104 to 102, and subsequently the write data is destaged from 104a to physical storage provisioned for the R2 device 126.

In at least one embodiment performing data replication operating in the synchronous replication mode, the first data storage system 102 receives a write I/O operation from one of the hosts 110a-c. The system 102 stores the write data in its data cache 103a. Consistent with discussion elsewhere herein, the write data is subsequently destaged from 103a to physical storage provisioned for the R1 device 124. Additionally, the write data is also transferred to the second data storage system 104, where the write data is then written to the data cache 104a, an acknowledgement is returned from system 104 to 102, and subsequently the write data is destaged from 104a to physical storage provisioned for the R2 device 126. The second data storage system 104 sends an acknowledgement to system 102 acknowledging receipt of the write data once the write data has been written to the data cache 104a of the system 104. The first data storage system 102 returns an acknowledgement to the host that sent the write I/O operation once the system 102 receives the acknowledgement from the system 104 regarding the write data.

Depending on the physical distance between the data storage systems 102, 104, it may be desirable to operate in a mode such as asynchronous to avoid host timeouts while the host awaits acknowledgement regarding completion of a host I/O.

Described in following paragraphs are techniques that may be used in connection with performing data replication with any suitable mode, such as asynchronous as well as synchronous and other suitable replication modes that may be operable with the particular RDF utilized in an embodiment in accordance with techniques herein.

Each time period for which writes are collected or captured may also be referred to as a cycle or delta set having an associated cycle or sequence number. Thus, writes directed to an R1 device may be collected for cycle 1, cycle 2, and the like, whereby the sequence or cycle number denotes the particular time period in a sequence of successive time periods for which writes are collected. In an embodiment in accordance with techniques herein, dependent write consistency may be provided by processing and preserving all writes to the destination R2 system in ordered sequential numbered sets. In this manner, the writes of each cycle may be applied in a sequential ordering to the R2 device based on the cycle or sequence number associated with each cycle of writes. Dependent write consistency refers to the maintenance of consistent replica data between the R1 source device and R2 destination device.

In one embodiment, writes collected within the same single cycle (e.g., writes having the same sequence or cycle number) may be applied in any order to the R2 device whereby such writes may be characterized as being write order independent. As writes during a time period or cycle are recorded, additional processing may be performed to obtain a final set of write operations actually transmitted from the R1 to the R2 data storage system whereby such writes in the final set are write order independent. For example, write folding may be performed for writes in a single capture cycle whereby if a single portion of data is updated multiple times, only the final or most recent data update is actually included in the final set transmitted to the R2 system. Since consistency is maintained between cycles, if replication stops, processing is performed to ensure that either a fully received cycle of write data is applied to the R2 device, or is otherwise discarded.

In one embodiment, a write may be included in a particular cycle if processing of the write operation has commenced within the time period of that particular cycle.

For each collection or cycle N of write data directed to the R1 device having an associated sequence number, processing may include a data collection or capture phase, a transmit or transmission phase, a receive phase and a restore or apply phase. Generally, writes are collected for a time period or a particular cycle in a capture phase on the R1 system, SRDF®/A transfers a cycle of data in the transmit phase from the R1 system to the R2 system, the receive phase on the R2 system receives data from the transmit phase, and the apply or restore phase with respect to a particular cycle refers to applying the cycle of data to the R2 device.

Figure 4:
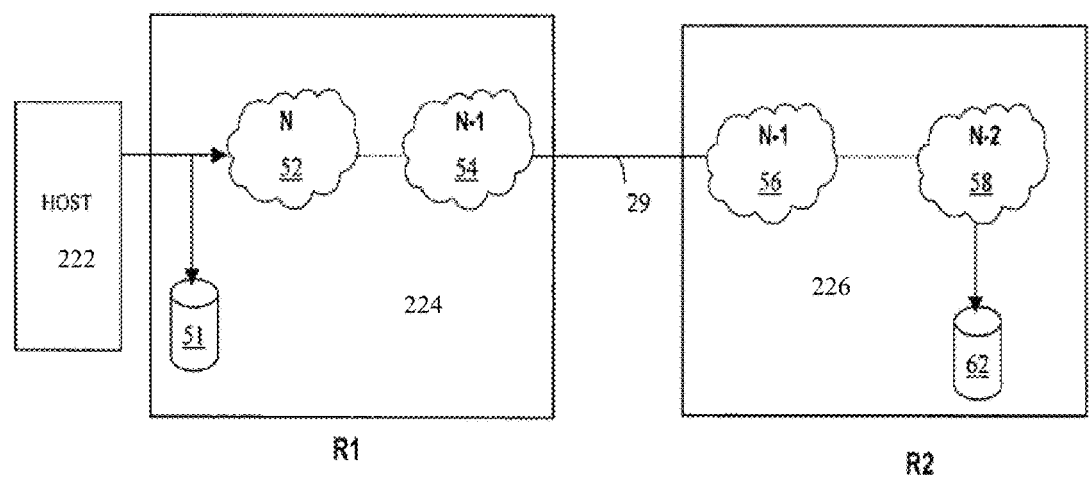

Referring to FIG. 4, a path of data is illustrated from the host 222 to the local R1 storage system 224 and the remote R2 storage system 226. Data written from the host 22 to the local storage system 225 is stored locally, as illustrated by the storage device 51. The data that is written by the host 222 to the local storage system 224 is also maintained by the local storage system 224 in connection with being sent by the local storage system 224 to the remote storage system 226 via the link 29.

In FIG. 4, the writes by the host 222 collected or captured for cycle N are shown as being assigned sequence number N, where N may be greater than zero in a system where the first cycle is denoted by 1. All of the writes performed by the host 22 that are assigned sequence number N are collected in a single cycle or collection of write data 52. The single cycle of write data 52 represents a plurality of separate writes by the host 22 that occur during a single collection cycle or time period.

Generally, the local storage system 224 accumulates writes of one sequence number or collection while transmitting a previously accumulated collection (having the previous sequence number) to the remote storage system 226. Thus, while the local storage system 224 is accumulating writes from the host 222 that are assigned sequence number N, the writes that occurred for the previous sequence number (N-1) are transmitted by the local storage system 224 to the remote storage system 226 via the link 29. A collection or cycle of writes 54 represents writes from the host 22 that were assigned the sequence number N-1 that have not been transmitted yet to the remote storage system 226.

The remote storage system 226 receives the data from the cycle or collection of writes 54 corresponding to writes assigned a sequence number N-1 and constructs a new cycle or collection 56 of host writes having sequence number N-1. The data may be transmitted using appropriate RDF protocol that acknowledges data sent across the link 29. When the remote storage system 226 has received all of the data from the cycle or collection 54, the local storage system 224 sends a commit message to the remote storage system 226 to commit all the data assigned the N-1 sequence number corresponding to the cycle or collection 56. Thus, sending the commit message by the R1 system to the R2 system indicates that all data of the cycle, such as cycle N-1, being transmitted has completed. Generally, once a collection or cycle of writes corresponding to a particular sequence number is committed, that collection or cycle of writes may be written to the logical storage device. This is illustrated in FIG. 4 with a collection 58 corresponding to writes assigned sequence number N-2 (i.e., two before the current sequence number being used in connection with writes by the host 222 to the local storage system 26). In FIG. 4, the collection or cycle 58 is shown as being written to a storage device 62 representing disk storage for the remote R2 device logically paired with R1 device 51 whereby processing is performed to replicate data of R1 device 51 on R2 device 62. Thus, the remote R2 storage system 226 is receiving and accumulating the collection of writes 56 corresponding to sequence number N-1 while the collection of writes 58 corresponding to the previous sequence number (N-2) is being written to disk storage 62 of the remote storage system 226. In some embodiments, the data for the collection 58 is marked for write (but not necessarily written immediately to the physical storage medium or storage device), while the data for the collection 56 is not (e.g. may be stored in cache or other memory buffer).

Thus, in operation, the host 22 writes data to the local storage system 224 that is stored locally in the R2 device 51 and is accumulated in the collection of writes 52. Once all of the data for a particular sequence number has been accumulated (described elsewhere herein), the local storage system 224 increments the sequence number. Data from the collection of writes 54 corresponding to one less than the current sequence number is transferred from the local storage system 224 to the remote storage system 226 via the link 29. The collection of writes 58 corresponds to data for a sequence number that was committed by the local storage system 224 sending a message to the remote storage system 226. Data from the collection 58 is written to the R2 storage device 62.

Note that the writes within a particular one of the collections 52, 54, 56, 58 are not necessarily ordered. However, as described in more detail elsewhere herein, every write for the collection 58 corresponding to sequence number N–2 was begun prior to beginning any of the writes for the collections 54, 56 corresponding to sequence number N–1. In addition, every write for the collections 54, 56 corresponding to sequence number N–1 was begun prior to beginning any of the writes for the collection 52 corresponding to sequence number N. Thus, in the event of a communication failure between the local storage device 24 and the remote storage device 26, the remote storage device 26 may simply finish writing the last committed collection of data (the collection 58 in the example of FIG. 4) and can be assured that the state of the data at the remote storage system 226 is ordered in the sense that the storage device 62 contains all of the writes that were begun prior to a certain point in time and contains no writes that were begun after that point in time. Thus, the R2 device, such as represented by element 62, always contains a point in time copy of R1 and it is possible to reestablish a consistent image from the R2 device.

In at least one embodiment with reference to FIG. 4, while capture is performed for writes of cycle N (e.g., element 52), the transmit phase (e.g., element 54) and receive phase (e.g., element 56) may be performed with respect to writes of cycle N–1 and the restore or apply phase (e.g., element 58) may be performed with respect to writes of cycle N–2. In such a system, the R1 system may send a commit message (regarding cycle N–1 write data) to the R2 system when the R1 system has completed transmitting all the cycle N–1 write data. The R2 system may send an acknowledgement regarding cycle N–1 to the R1 system when all the cycle N–1 write data has been received at R2 and when R2 has also completed applying the writes of cycle N–2 to the R2 device.

The time that elapses from when a host 222 issues an I/O operation to the local data storage system 224 and when the I/O completes is experienced as I/O latency by the host. Thus, for example with reference to a system using RDF for remote replication operating in synchronous mode, the I/O latency is greater than when operating in asynchronous mode due to the additional time the elapses prior to the local data storage system 224 returning an acknowledgement regarding completion of the write to the host. Generally, I/O latency is an important performance consideration with regard to data replication techniques. Some systems may perform data compression in connection with replication. For example, the write data being transferred from system 224 to system 226 may be compressed prior to transmission over a network connection 29 in order to reduce network bandwidth consumption, to increase overall throughput of the host write data and also reduce the I/O latency in connection with performing replication. However, such compression techniques that may be utilized have drawbacks.

Existing software compression/decompression techniques tend to be highly CPU intensive and thus may consume undesirable amounts of CPU cycles. Furthermore, software compression/decompression may contribute to the higher than desirable I/O latency due to the additional amount of time required to perform such operations. Thus, in one aspect, software compression may provide a benefit by consuming less network bandwidth for data transfer between system 224 and 226. However, one added drawback is the additional CPU resources consumed by the data storage system 224, 226 thereby contributing to possibly increased I/O latency. Data compression may also be performed in hardware such as using a hardware compression device for compression/decompression operations. However, hardware compression also has drawbacks by requiring use of the special hardware compression device on both the systems 224 and 226 for the particular compression technique performed. However, the startup overhead associated with the hardware compression programming (e.g., pinning the source and destination buffers, posting the descriptors, and checking for completion notifications) introduces additional latency to the I/O operations. The hardware compression device may also be also responsible for handling back-end compression for writing the compressed data onto the physical storage devices whereby the hardware device may be a resource of contention that is overloaded by demands needed for back-end compression as well as compression required for compressing the write data for RDF transfer.

Described in following paragraphs are techniques that may be used in connection with performing replication where such techniques overcome drawbacks, such as increased I/O latency, otherwise incurred with compression techniques. Techniques described in following paragraphs apply data deduplication techniques to the replication or write data transmitted from the local system 224 to the remote system 226. In at least one embodiment, the data deduplication applied to the replication or write data may be applied to the one or more collections, cycles or sequences of collected write data 52 and 54 transferred from local system 224 to remote system 226. In at least one embodiment, techniques described herein may implement hash tables and synchronize the hash table sets across the local and remote systems to retrieve the complete original host I/O data. Such techniques eliminate transferring duplicate host I/O data that is replicated across the local and remote systems. In at least one embodiment in accordance with techniques herein, data deduplication may be performed on write I/Os, and in particular, at a per-write I/O level of granularity in efforts to recognize duplicate write I/Os before transfer from system 224 to 226 over network connection 29. For example, in at least one embodiment, processing may be performed to determine, for each single write I/O, whether the current single write I/O's data payload is a duplicate of another write I/O's data payload previously processed (where such write I/O data is current stored in a hash table so that the current single write I/O data payload is a duplicate of that stored in the local system hash table). If so, metadata for the current write I/O (having the duplicate write data payload) may be transferred from the local to remote systems without repeating the transfer of the redundant duplicate write I/O data payload itself. As described in following paragraphs, at least one embodiment of the techniques herein utilize a hash table data structure where the local and remote system hash tables are maintained in a synchronized manner. The foregoing and other aspects of techniques herein are set forth in more detail in following paragraphs.

Figure 5:
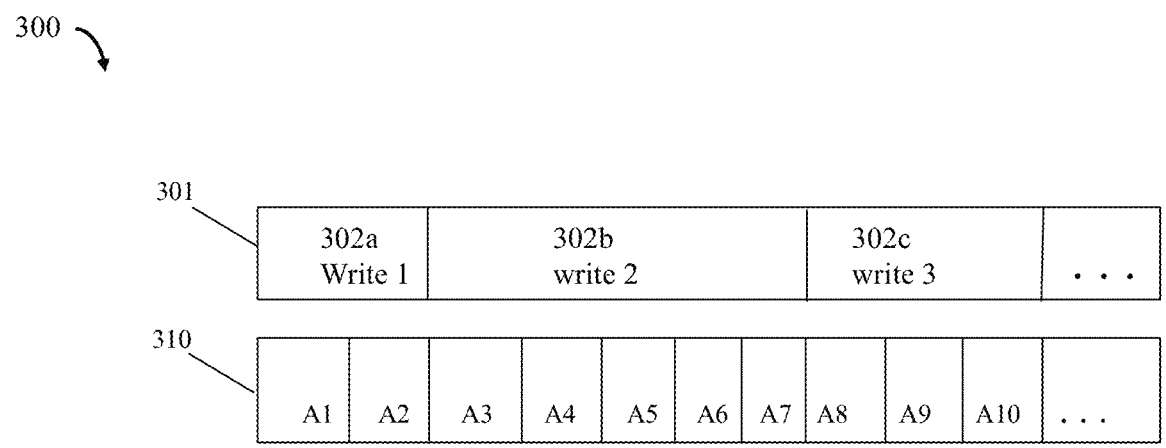
FIG. 5 is an example illustrating host write I/O operations in an embodiment in accordance with techniques herein.

Referring to FIG. 5, shown is an example 300 illustrating write data of a host write I/O operations in an embodiment in accordance with techniques herein. Element 301 illustrates write data or payload for a sequence of host write I/O operations. In particular, 302a denotes the write data or write I/O payload of a first write, write1; 302b denotes the write data or write I/O payload of a second write, write2; and 302c denotes the write data or write I/O payload of a third write, write3. Element 310 denotes data chunks or portions each of a same unit size, such as a specified number of bytes. In this example, write 1 302a may write 2 data chunks or portions A1 and A2; write 2 302b may write 5 data chunks or portions A3-A7; and write 3 302c may write 3 data chunks or portions A8-A10.

In at least one embodiment in accordance with techniques herein, the granularity of write I/O payload or write data used in data deduplication is each single host write I/O. Thus, in embodiments where host write I/Os may have varying write I/O payloads, the granularity of the data portion or chunk size used in performing data deduplication may vary in size. For example, in connection with the example 300, assume each of the data portions A1-A10 of 310 are 512 bytes. In this case, data deduplication processing (as described herein as performed in connection with remote replication) operates on variable size data chunks where data deduplication is performed to determine whether the write data of a current write I/O is a duplicate of a previous write I/O. Such processing uses a first chunk size of 1024 bytes (e.g., A1, A2, 2*512 bytes) for write 1 302a; a second chunk size of 2560 bytes (e.g., A3-A8, 5*512 bytes) for write 2 302b, and a third chunk size of 1536 bytes (e.g., A8-A10, 3*512 bytes) for write 3 302c.

Thus, in at least one embodiment in accordance with techniques herein, the stream of host write I/O data is not further partitioned into fixed size data chunks for use with data deduplication. Rather, in at least this one embodiment in accordance with techniques herein, the write I/O data payload of each host write I/O is processed as a single unit or chunk (possibly of various sizes) in connection with data deduplication processing for use with remote replication. Additionally, each single write I/O and its write I/O data payload may be associated with metadata (MD) used to generally describe the particular write I/O and its data payload. As described in more detail elsewhere herein, the MD may be included with information transmitted from the local system 224 to the remote data storage system 226 in connection with performing remote data replication techniques.

In at least one embodiment, the maximum data or payload size of any host I/O may be a single track of 128 KB. Thus, an embodiment may allocate any needed suitable buffers, other memory, and structures for use with techniques herein to accommodate the maximum write I/O data payload and associated metadata.

Figure 6:
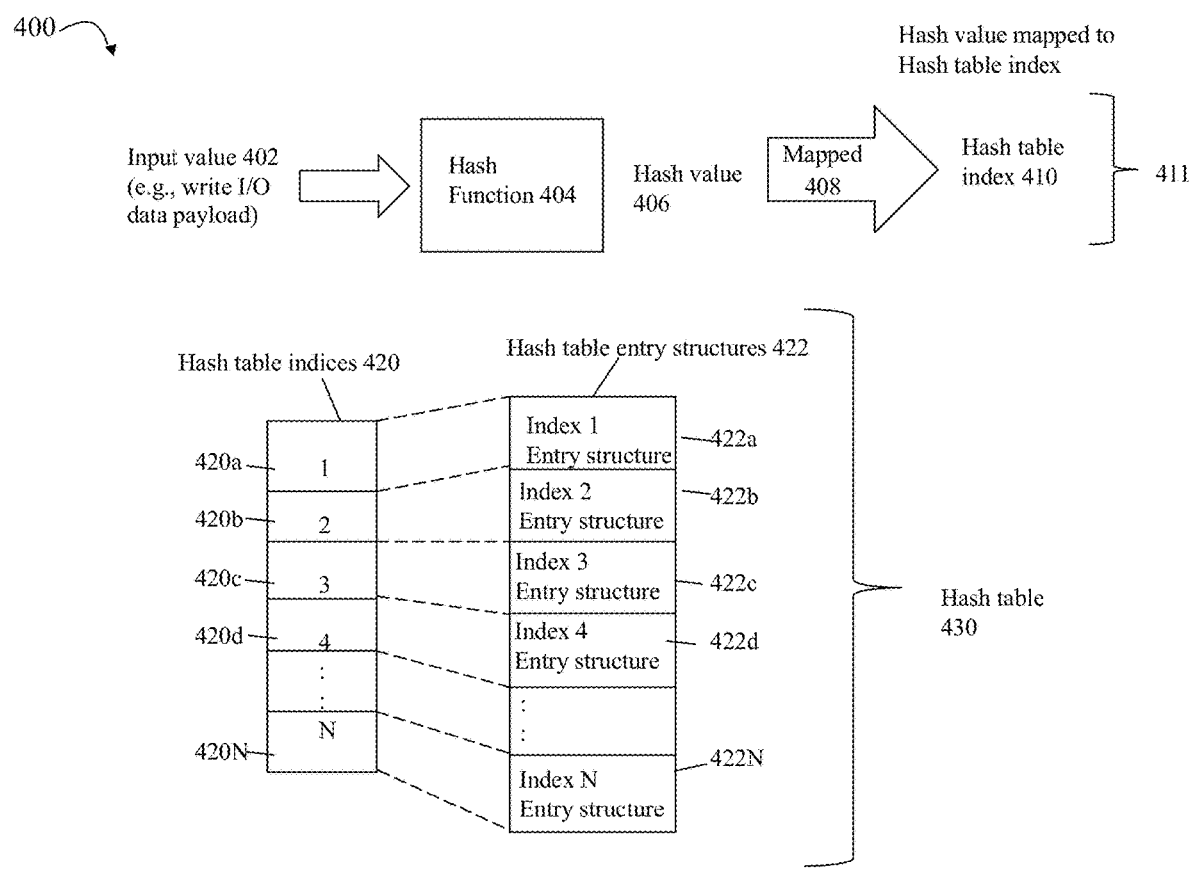
FIG. 6 is an example illustrating processing performed and a representation of a hash table in an embodiment in accordance with techniques herein.

Referring to FIG. 6, shown is an example 400 illustrating a hash table 430 and processing 411 that may be performed in an embodiment in accordance with techniques herein. Consistent with discussion elsewhere herein, a hash table or hash map 430 may be used to store copies of the unique write I/O data in various table entries. Hash tables are data structures generally known in the art. In this example, the hash table 430 is a data structure including N entries, N being an integer generally greater than 0. Element 420 denotes the N hash table indices, with each of the N index values (420a-N) having a corresponding one of the hash table entry structures 422 (422a-N). The hash table entry structures 422 store the unique or single instances of write I/O data payload which are mapped to various hash table indices 420. For example, index 1 entry structure 420a includes the unique or single instances of write I/O data payload mapped to the hash index 1 420a. In a similar manner, each of the index "i" entry structures 422a-N include the unique or single instance of write I/O data payload mapped to the corresponding hash index "i" 420a-N. The hash table entries 422 may also store additional information, such as described in more detail below. In at least one embodiment, the hash table indices 420 may be implemented as an array of pointers. The computed hash index may be used to index into the array of pointers, where each of the pointers of the array 420 points to a corresponding one of the entry structures of 422 for that particular hash index.

Element 411 illustrates the general processing that may be performed to map write I/O data payload of a single host write I/O to a corresponding hash table index of 420, and thus, a corresponding one of the entry structures 422. The write I/O data payload is used as an input value 402 into a hash function 404. The hash function 404 may generally be any suitable mathematical hash function or algorithm known in the art. For example, the hash function 404 may be a cryptographic hash function such as the SHA (secure hash algorithm)-256 algorithm which generates a 256 bit hash value 406 as the output. The hash value 406 may then be mapped 408 to one of the N hash table indices 420.

As noted above, each hash table entry 422a-N stores information including the single unique copy of the write I/O data payload. The hash table 420 in at least one embodiment as described herein also implements separate chaining of the I/O entries in the hash table in case of hash collisions. As known in the art, a hash table collision or hash collision may occur when two different write I/O data payload instances are mapped to the same hash index. Different techniques may be used to handle processing upon the occurrence of a hash collision. In at least one embodiment in accordance with techniques herein, unique different write I/O data payload instances that are mapped to the same hash index may be stored in a chain or list associated with the hash index. For example, assume that 3 different write I/O data payload instances, A, B and C, are mapped to hash index 1 420. In this case, 3 different index entry structures may be stored as a linked list associated with the hash table index 1 420a. For example, rather than have a single entry 422a pointed to by the hash table index 1 420a, 422a be denote a linked list of 3 entry structures where the linked list is associated with index 420a, and each entry of the linked list includes information for a different one of the 3 write I/O data payload instances A, B and C. The multiple entries of the linked list corresponding to the same hash table index may be further differentiated using a collision value denoting the position (e.g., 0, 1, 2, 3, etc.) of the particular entry in the linked list of chained write I/O data entries. Thus, in at least one embodiment in accordance with techniques herein using the hash table of indices 420 with chaining of multiple entries which collide (and thus have the same associated hash value), each hash table entry structure of the hash table may be uniquely identified using the hash table index and collision value denoting a position on the chained list.

Figure 7:
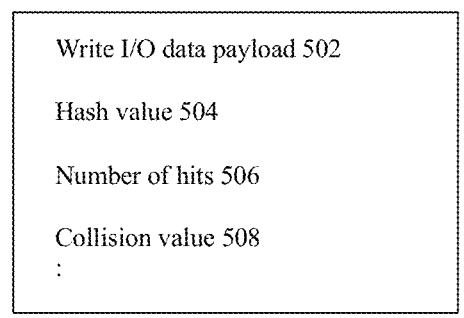
FIG. 7 is an example illustrating information that may be stored in a hash table entry in an embodiment in accordance with techniques herein.

Referring to FIG. 7, shown is an example of information that may be stored in each entry of the hash table (e.g., each of the entry structures of 422) in an embodiment in accordance with techniques herein. The entry 500 may include the unique instance of the write I/O data payload 502, the hash value 504 generated by the hash function 404 for this particular write I/O data payload 502, the number of hits 506 (denoting the number of times this write I/O data payload 502 has been detected as a duplicate of another write I/O in connection with data deduplication processing) and collision value 508 (denoting the position in the list of chained hash entries of this particular entry where the chained list is associated with a hash table index). Each of the entries of 422 may also include other information.

Figure 8:
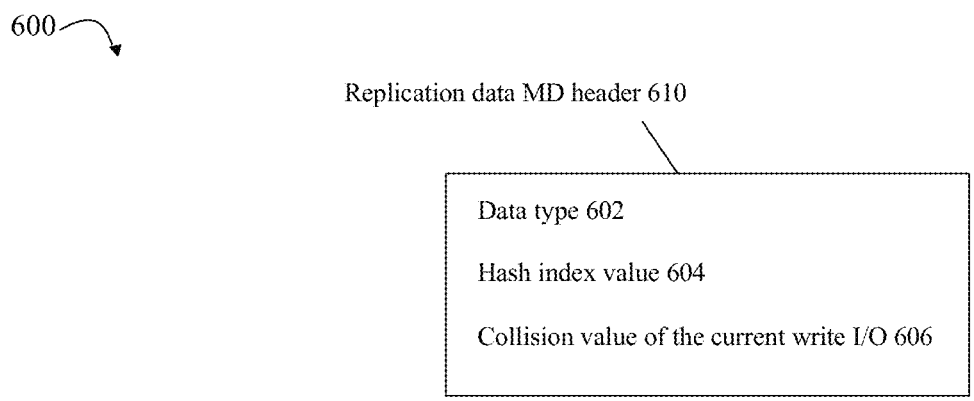
FIG. 8 is an example illustrating information that may be included in a metadata header associated with a write I/O operation in an embodiment in accordance with techniques herein.

Following is an example written in a C-like language notation that further illustrates the fields that may be included in the entry structures of 422. The fields below may be used to implement those as illustrated in FIG. 7 and also include additional items in connection with implementing the chain of possibly multiple entries mapped to the same hash index: Struct
{
    Char *data; /* pointer to write I/O data payload 502 */
    UINT32 data_length; /* length of the write I/O data payload 502 stored in this entry */
    Char * hash value; /* hash value 504 computed using the hash function for this write I/O data payload */
    UINT32 num_hits; /* number of times 506 this write I/O data payload is detected as a duplicate of another write I/O in connection with data deduplication processing */
    T_HASH_ENTRY *head; /* pointer to the head of the chained list of entries mapped to this hash index */
    T_HASH_ENTRY *next; /* pointer to the next entry in the chained list */
    T_HASH_ENTRY *tail; /* pointer to last entry in the chained list */
    UINT32 collision value; /* represents the position of this entry in the linked list of chained IO data */
. . .
}T_HASH_ENTRY [N];

Referring to FIG. 8, shown is an example 600 illustrating metadata (MD) that may be created and associated with each single host write I/O operation having its data transmitted from local system 224 to remote system 226. The MD associated with a single write I/O that has its write data payload replicated on the remote data storage system may also be referred to as the replication data MD header 610. In at least one embodiment, the MD header 610 may include a data type 602, a hash index value 604 (e.g., index into the hash table, where the hash value (as computed using the hash function 404 for the write I/O data payload of the write I/O) is mapped to one of the hash table indices for the write I/O associated with this MD header instance), and a collision value 606 for the associated write I/O (denoting the collision value of the hash table entry in the chained linked list of entries associated with hash index value 604). The data type 602 is described in more detail below. In at least one embodiment, the replication data MD header 610 associated with each single host write I/O may be 20 bytes.

For a write I/O operation, its corresponding replication data MD header 610 includes field 602 that indicates whether the write I/O operation data payload has been deduplicated (e.g., removed) and is therefore not included in the final buffer/representation of replication data transmitted from the local to the remote data storage system. In at least one embodiment, the replication data MD header 610 may include a data type field 602 that indicates whether the write I/O data payload is "unique" (e.g., not currently stored in the hash table), or whether the write I/O data payload is a "duplicate" of another write I/O data payload previously processed and transmitted to the remote system (e.g., current write I/O data payload is a duplicate of a prior write I/O payload data currently stored in the hash table). If the data type is unique, the final buffer representation of replication data transmitted from the local to the remote data storage system does include the write I/O data payload. Otherwise, if the data type is duplicate, the final buffer representation of the replication data transmitted from the local to the remote data storage system does not include the write I/O data payload.

In at least one embodiment, the final buffer representation of data transmitted from the local to the remote data storage system includes an instance of the replication data MD header for each write I/O being replicated. Additionally, the write I/O data payload for the write I/O may also selectively be included in the final buffer representation following the MD header only if the MD header indicates that the write I/O payload is "unique".

If the write I/O processed using techniques herein has associated write I/O data payload that is unique (e.g., not currently having a matching corresponding entry in the local system hash table), the write I/O data payload is transmitted to the remote system along with the index value 604, collision value 606 of the local system hash table entry. The MD header 610 for the write has its data type field 602 updated to indicate unique. Additionally, the MD header 610 for the write operation has its the index value 604 and collision value 606 set those of this unique hash table entry inserted in the hash table on the local system. The same index value 604 is used on the remote peer data storage system to insert this new unique IO data information into a corresponding entry in the hash table instance used on the remote system, as will be described in more detail in following paragraphs.

If a write I/O is a duplicate of previously transmitted write I/O data payload (e.g., having a matching corresponding entry in the local system hash table), the MD header 610 for the write has its data type field updated to indicate duplicate. Additionally, the MD header 610 for the write operation has its the index value 604 and collision value 606 set those of this unique hash table entry currently already stored in the hash table of the local system. The same index value 604 is used on the remote peer data storage system to retrieve the write I/O data payload 502 from the appropriate corresponding entry in the hash table instance used on the remote system, as will be described in more detail in following paragraphs.

In at least one embodiment in accordance with techniques herein, when the local hash table is "full" (e.g., each of the index values of 420 is associated with at least one hash table entry whereby there are no remaining index values of 420 for use with storing new unique write I/O data payload instances whereby any next write I/O will result in a hash collision), processing may be performed to remove one or more entries from the table. For example, in at least one embodiment, entries may be removed from the table where such removed entries have the least number of duplicate I/O data entry hits (e.g., remove those entries having the smallest or minimum number of hits 506 with respect to all existing entries in the table. For example, with reference back to FIG. 6, assume all the N indices 420a-N having associated entry structures 422a-N whereby hashing the write data payload of the next write I/O will always result in a hash collision. At this point time, processing may be performed to remove one or more entries from the table. For example, an embodiment may remove a specified number of entries of 422 where such removed entries have the least or minimum number of hits 506 of all entry structures 422a-N. As will be appreciated by those skilled in the art, any changes made to the local hash table in connection with freeing up and removing entries are communicated to the remote system so that the remote system's hash table may be synchronized with the local system's hash table.

Generally, techniques herein process host I/O write operations having data to be transferred from the local data storage system 224 to the remote data storage system 226 as part of replication processing performed by RDF. Such processing performed by the local data storage system 224 includes deduplicating redundant write I/O data payloads to unique instances of write I/O data payload and, for those duplicate write I/O data payloads, references to the unique instances. Such processing may be performed by system 224 in connection with egress or outbound processing of write data transmitted from system 224 to system 226. In turn, the remote system 226 receiving the deduplicated host write I/O operation also performs processing to unwrap or restore the deduplicated write data to its original form on the ingress/inbound processing. Data deduplication is known in the art and generally refers to removing redundant or duplicate data whereby only a single instance of the write I/O data payload is retained with pointers or references used in connection with duplicate or redundant copies (which reference or identify the single instance of the write I/O data payload).

The processing performed on the systems 224 and 226 in an embodiment in accordance with techniques herein is described in more detail below with reference to a particular example. Generally, write data of a host write I/O operation may be received by the local or R1 data storage system. The write I/O operation is a write directed to the R1 device of a configured R1-R2 device pairing such as illustrated in connection with FIGS. 3 and 4 described elsewhere herein. Processing will be described below as performed on the local or R1 data storage system for the write data to be transmitted for replication on the corresponding R2 device of the remote or R2 data storage system. Additionally, processing will be described below as performed on the R2 or remote data storage system to apply the received write data to the R2 device.

During initialization on the local system and prior to I/O transfer, the local and remote RDF systems allocate memory storage for the hash tables. In at least one embodiment, such processing may include allocating the hash table indices 420 and N index entry structures 422 used for entries of the hash table.

In a first step on the local data storage system (R1 system), for a current write I/O being processed for replication, the hash value is computed for the write I/O payload of the current write I/O. Processing of this first step that may be performed in at least one embodiment in accordance with techniques herein is described above.

In a second step on the local data storage system, for the current write I/O being processed for replication using techniques herein, the hash value may be mapped to a corresponding hash table index. In at least one embodiment, the index may be computed as the mathematical modulus of N. As known in the art, given two positive numbers, a (the dividend) and n (the divisor), a modulo n (abbreviated as a mod n, or also "a % n") is the remainder of the Euclidean division of a by n. Thus, in this case, the hash value is divided by N, the number of hash table indices whereby the remainder of this division operation is the index mapped to, and used for, the hash value. The second step may also include searching for a duplicate entry in the hash table. In particular, the computed index for the current write I/O is used to index into the list of hashing table indices 420 where the one or more existing entries, if any, currently stored in the hash table and associated with the index are examined to determine whether there is an existing duplicate entry in the table that includes the same write I/O data payload as the current write I/O.

For example, assume the write I/O has an associated computed index value of 1, any/all entries 422a existing in the table pointed to by hash index 1 420a are examined whereby the hash value of each existing entry of 422a is compared to the computed hash value for the current I/O. If there are no existing entry structures 422a containing valid data for a write I/O (meaning that the hash table currently does not include write I/O data payload for the hash index 1) or if there is no existing duplicate or matching entry for the current write I/O (e.g., computed hash value for current write I/O does not match a hash value of any existing entry in the table associated with hash index 1), then processing determines that there is no matching or duplicate entry currently contained in the hash table with write I/O data payload matching the current write I/O. In this case, the current write I/O is determined as unique and processing is performed to insert the current write I/O data payload into the hash table. In particular, the write I/O data payload is inserted into the entry structure pointed to by the computed index of 420. In this example for the hash index 1 420a, new entry 422a is inserted for the current write I/O whereby 422a is pointed to by 420a. Not finding a duplicate in the hash table for a host write I/O may be a common case, for example, in connection with host writes first processed after initialization since the hash table is empty.

When a new entry is added to the hash table for the current write I/O, the MD header 610 for the current write I/O that will be transmitted to the remote data storage system may also have corresponding fields updated. In particular, the MD header 610 for the current write I/O may have its data type 602 updated to be unique and the computed index value 604 and collision value 606 may also be updated in accordance with the current write I/O and its corresponding new entry just added to the hash table on the local system. The same index value 604 is used on the remote peer storage system to insert a corresponding entry in the hash table on the remote system for this current write I/O. As described elsewhere in an embodiment described herein, the hash table may use a chain or linked list of entries which have hash collisions that occur with respect to the same hash table index.

In connection with the second step performed on the local system, processing may alternatively successfully locate a duplicate matching entry of the hash table for the current write I/O (whereby the matching entry has a hash value that matches the computed hash value for the current write I/O). In this case, the index value and the collision value corresponding to the duplicate hash table entry may be included in the information transmitted to the remote data storage system whereby the write I/O data payload is omitted and not sent for the current write I/O. In this case, the MD header 610 for the current write I/O may be updated so that its data type field 602 denotes a duplicate, and the computed index value 604 and collision value 606 may also be updated in accordance with the current write I/O and its corresponding duplicate matching entry existing in the hash table on the local system. On the remote system as described elsewhere herein, the index value 604 and collision value 606 may be used to retrieve the current write I/O data payload from an existing entry already stored in the hash table on the remote system.

Figure 9:
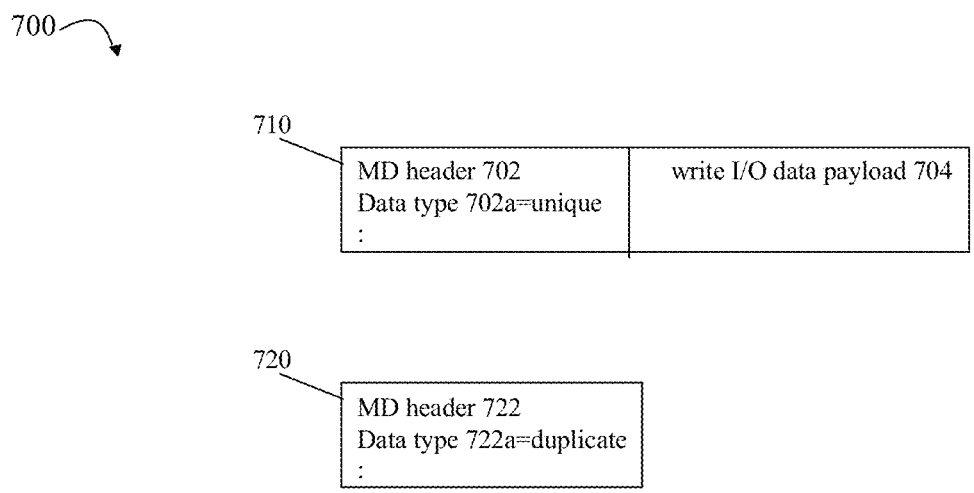
FIG. 9 is an example illustrating final buffers of data sent from the local to the remote system in an embodiment in accordance with techniques herein.

In a third step on the local data storage system, the final representation of the current write I/O as stored in the final buffer may be transmitted to the remote data storage system. If processing of the second step above on the local system has determined that the current write I/O is unique and is not a duplicate of write I/O data payload previously transmitted to the remote system, the write I/O data payload for the current write I/O along with the updated MD header as mentioned above may be dispatched to the network and then transmitted to the remote system. In this case where the current write I/O is unique, its associated MD header 610 includes fields as described in connection with FIG. 7 where the data type field 602 indicates this write I/O is unique. Furthermore, consistent with the unique data type 602, the final buffer for the current write I/O includes both the MD header and also the write I/O data payload. The foregoing final buffer to a unique write I/O is illustrated in the example 700 of FIG. 9. Element 710 denotes the final buffer for the current write I/O which is a unique I/O whereby there is no existing duplicate entry of the hash table including the write I/O data payload and whereby a new entry including the current write I/O data payload is added to the hash table. The final buffer 710 includes the MD header 702 for the current write I/O indicating the data type 702*a* of unique. The final buffer 710 also includes the write I/O data payload 704 for the current write I/O.

Also as part of the third step on the local data storage system, if processing of the second step above on the local system has determined that the current write I/O is a duplicate of write I/O data payload previously transmitted to the remote system (whereby a duplicate existing entry in the hash table for the current write I/O has been determined in the second step processing), the final buffer for the current write I/O does not include the write I/O data payload for the current write I/O and rather only includes the updated MD header for the current write I/O. In other words, with reference to FIG. 9, for a write I/O determined as a duplicate, the final buffer 720 includes the MD header 724 with the data type field 724*a* set to duplicate. However, the final buffer 720 does not include the write I/O data payload for the current write I/O.

In the case of a duplicate write I/O where the final buffer 720 does not include the write I/O data payload for transmission to the remote system, network bandwidth usage is thus reduced (as compared to implementations where no data deduplication is performed). From the above final buffer 720, techniques herein provide for eliminating the need to transfer the write I/O data payload when it has already been transmitted to the remote system in connection with a previous write I/O and where such write I/O data payload still resides in an entry of the hash table.

In a first step performed on the remote or R2 data storage system, the final representation of the write I/O (e.g., final buffer contents) as transmitted from the R1 or local system is received and processed on the remote system. Such processing on the remote system includes extracting the write I/O's MD header from the received final representation and parsing the MD header to extract the data type, index value and collision value for the current write I/O's information transmitted for replication on the remote system. Consistent with discussion above, a data type of unique in the MD header indicates that the final representation received includes the information as in 710 of FIG. 9; and a data type of duplicate in the MD header indicates that the final representation received includes the information as in 720 of FIG. 9.

In a second step on the remote system, the received write I/O having its corresponding information in the received final representation is processed in accordance with the received data type extracted from the MD header.

For the unique I/O data type, the second step performed in the remote system includes adding an entry to its hash table at the received and extracted index value of the final representation (e.g., index value of the MD header of the final representation received in the first step of the remote system processing). Consistent with discussion herein, the unique data type indicates to the remote system that the local system has entered a new entry in its local system hash table with the received index value. Accordingly, the remote system now does the same with respect to its remote system hash table whereby the first hash table of the local system and the second hash table of the remote system are synchronized with respect to the current write I/O. The remote system now adds an entry to its hash table where the new entry is associated with the index value extracted from the MD header of the final representation received in the first step. The write I/O data payload is extracted from the final representation, where the write I/O data payload is subsequent to the received MD header 702 (as illustrated in 710). The new entry includes a copy of the write I/O data payload. The new entry has a position in the linked list (associated with, or pointed to by, the index value) where the position is denoted by the collision value of the received MD header for the write I/O. In this manner, the new entry for the received write I/O is created and inserted into the hash table of the remote system in the same location as in the hash table of the local system (thereby synchronizing the hash tables of the local and remote systems).

If the remote system's hash table already has an entry at the respective index value and collision value (as extracted from the MD header of the final representation of the current I/O), the entry is removed and updated with the information as described herein for the current I/O. In one aspect, the remote system hash table contents may be characterized as controlled by the contents of the local system's hash table in order to maintain synchronization of entries in both such tables.

For the duplicate I/O data type (e.g., where the final representation is 720 as in FIG. 9), the second step performed on the remote system includes retrieving the write I/O data payload for the current write I/O received from the remote system's hash table using the index value and collision value parsed/extracted from the MD header (e.g., as extracted/parsed in the first step performed on the remote system). The remote system allocates a sufficient amount of buffer memory equivalent to the length of the write I/O data payload, and copies the original unique write I/O data payload from the remote system's hash table entry (e.g., as identified by the index value and collision value of the received MD header) into the allocated buffer memory. At this point, the remote system may perform processing to apply the write I/O and write I/O data payload as stored in the allocated memory buffer to the R2 device and thus replicate the write I/O on the R2 device. The second step for the duplicate I/O data type may now include storing the write I/O data payload from the allocated memory buffer into cache whereby the cached write I/O data payload may be later destaged (e.g., written out) to physical non-volatile backend storage provisioned for the R2 device.

In a third step on the remote system, after the write I/O data payload for the write I/O has been stored in the cache of the remote system, the remote system may send an acknowledgement back to the local system (R1) denoting completion of the write I/O on the remote system.

In at least one embodiment, in the case of an error where the corresponding entry for the duplicate received write I/O is not found in the remote system hash table, the remote system may send a re-transmit request to the local system. The re-transmit request may identify the collision value and hash value of the current write I/O whose corresponding write I/O data payload is to be re-transmitted from the local to the remote system. In response to the re-transmit request, the local system may send information for the current write I/O that may be characterized as complete write I/O information including the write I/O data payload as denoted by 710 of FIG. 9. In other words, in response to the retransmit request, the local system may send the information 710 comprising the MD header 702 with the data type of unique. The complete write I/O information (for the current write I/O) sent in response to the re-transmit request may further include the MD header 702 with the unique data type and with the same hash value and collision value as identified in the re-transmit request.

Figure 10:
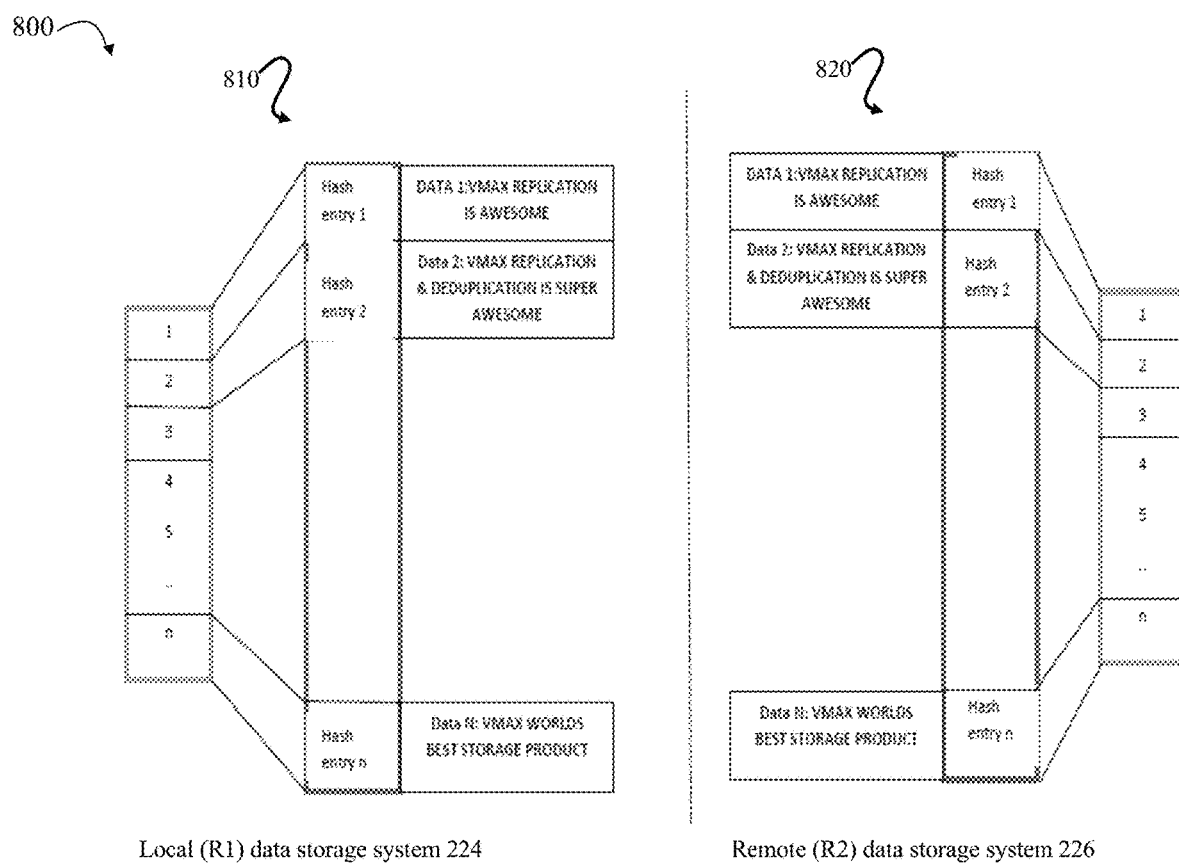
FIG. 10 is an example illustrating synchronized hash tables of the local and remote systems in an embodiment in accordance with techniques herein.

Referring to FIG. 10, shown is an example illustrating proposed synchronized hash tables on both the local and remote data storage system in an embodiment in accordance with techniques herein. The example 800 includes a first hash table 810 on the local (R1) data storage system 224 and a second hash table 820 on the remote (R2) data storage system 226. Assume, for example, that 3 write I/Os were processed on both the local and remote systems using processing described above. The 3 write I/Os may have write I/O data payloads with hash values that map to hash table entries 1, 2 and N. The example 800 illustrates the state of the local and remote system hash tables after both systems have completed processing for the 3 write I/Os in connection with the techniques described herein for replication using data deduplication per write I/O in an embodiment in accordance with techniques herein. As will be appreciated by those skilled in the art, elements 810 and 820 are instances of the hash table described in more detail herein, such as illustrated and described in connection with FIG. 6.

Techniques described above for performing data deduplication using hash tables in connection with remote replication processing is described in more detail below with reference to simple examples.

As a first further example, consider two I/Os, IO1 and IO2, which have two unique associated write I/O data payloads that need to be replicated from the local system to the remote system. Since both I/Os are unique, the write I/O data payloads of the two I/Os are stored in entries associated with different hash table indices in the local hash table.

Figure 11:
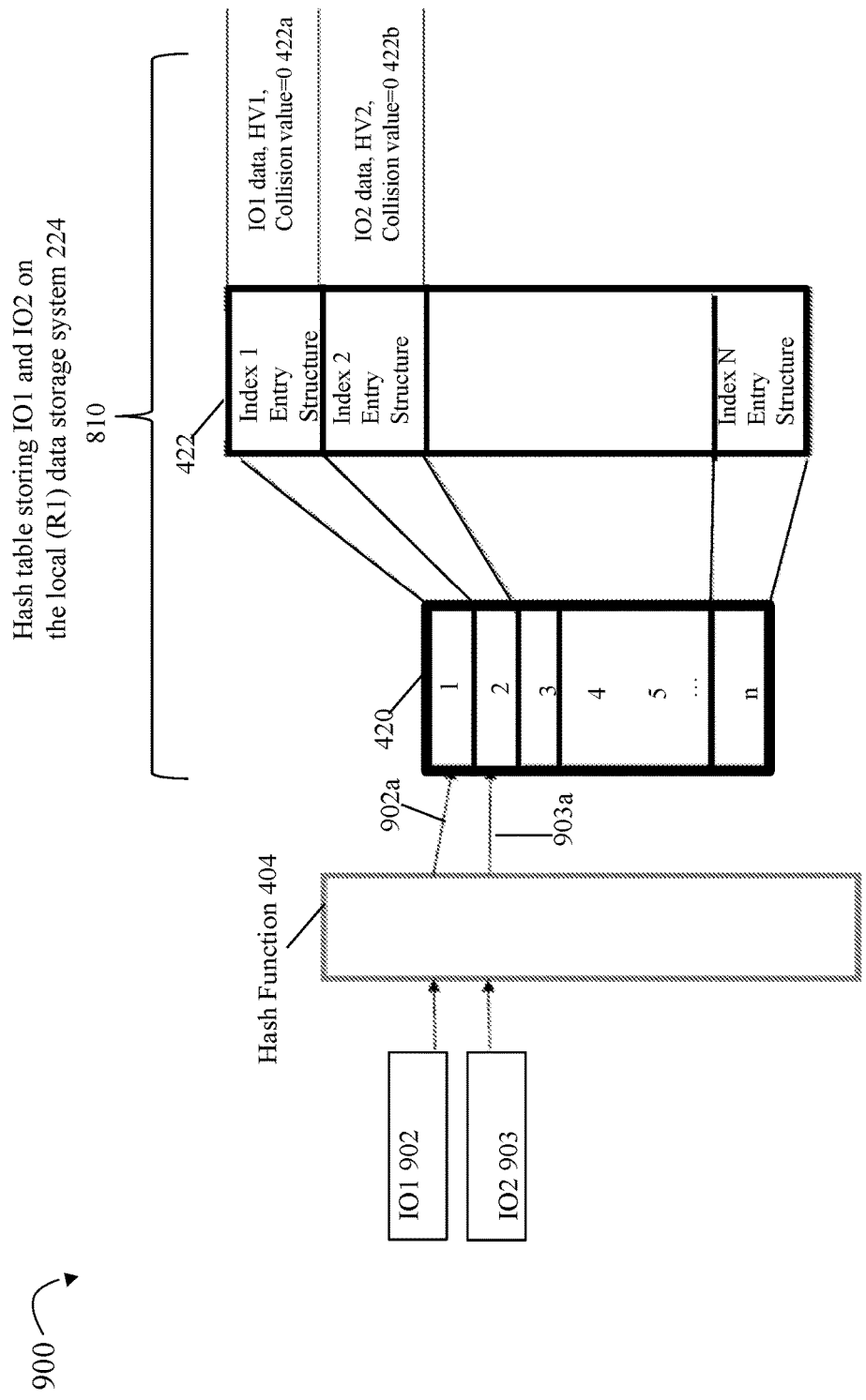
FIGS. 11, 12, 13 and 14 include various data structures in connection with examples illustrating use of techniques in an embodiment in accordance with techniques herein.

Referring to FIG. 11, shown is an illustration of the first example including the hash table on the local system in an embodiment in accordance with techniques herein. The example 900 includes IO1 902 and IO 903 where write I/O data payloads of IO1 902 and 903 are provided as inputs to the hash function 404. Consistent with discussion herein, such as in connection with FIG. 6, the hash function 404 generates a first hash value HV1 for IO1 902 and a second hash value HV2 for IO2 903. In this example, HV1 is further mapped 902a to hash index 1, and HV2 is mapped 903a to index 2. The example 900 illustrates entry structure 422a pointed to by the hash index 1 and entry structure 422b pointed to by hash index 2. Entry 422a is illustrated as including the write I/O data payload of IO1, HV1, and a collision value of 0, (indicating that hash index 1 is only associated with a single entry 422a and there have been no hash collisions for hash index 1). Entry 422b is illustrated as including the write I/O data payload of IO2, HV2, and a collision value of 0, (indicating that hash index 2 is only associated with a single entry 422b and there have been no hash collisions for hash index 2).

In connection with processing performed on the local system as described above, the example 1000 of FIG. 12 illustrates the final representation of information for the two I/Os 902, 903 as stored in final buffers transmitted from the local to the remote system. The final buffer 1010 for IO1 as generated by the local system includes MD header 1012 and write IO1 data payload 1014. The MD header 1012 includes a data type of unique, hash index=1, and a collision value=0 (e.g., element 1012 is an instance of the MD header of FIG. 8 with values set in accordance with IO1 902). The final buffer 1020 for IO2 as generated by the local system includes MD header 1022 and write IO1 data payload 1024. The MD header 1022 includes a data type of unique, hash index=2, and a collision value=0 (e.g., element 1022 is an instance of the MD header of FIG. 8 with values set in accordance with IO2 903).

The final buffers 1010 and 1020 are generated as a result of local storage system processing as described above. The contents of the final buffers are sent from the local to the remote system where buffers 1010 and 1020 are processed as described above in connection with remote system processing. In this example for IO1 and IO2, the received data types for IO1 and IO2 are unique whereby the remote system stores copies of the payload data for both write I/Os IO1 and IO2 in the hash table of the remote system. In particular, with reference to the example 1100 of FIG. 13, the remote system stores write IO1 data payload in hash entry 822a based on the collision value=0 and index value=1 as included in the final buffer data 1010 received at the remote system. The remote system also stores write IO2 data payload in hash entry 822b based on the collision value=0 and index value=2 as included in the final buffer data 1020 received at the remote system.

Figure 12:
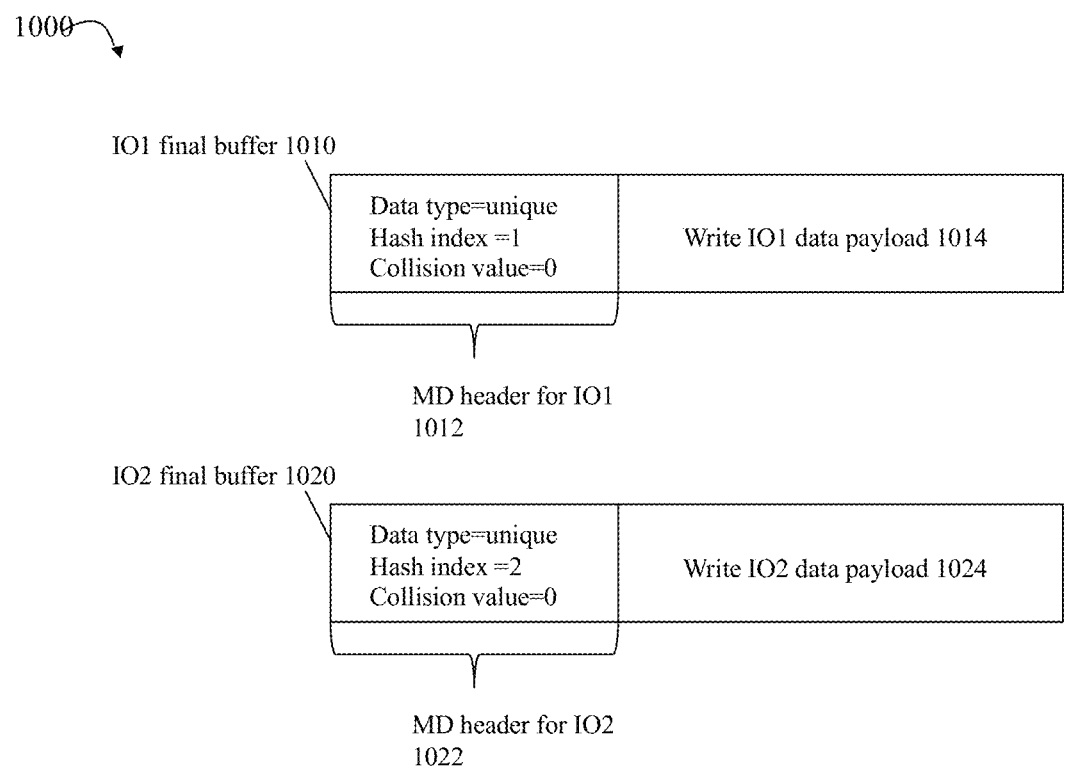
Figure 13:
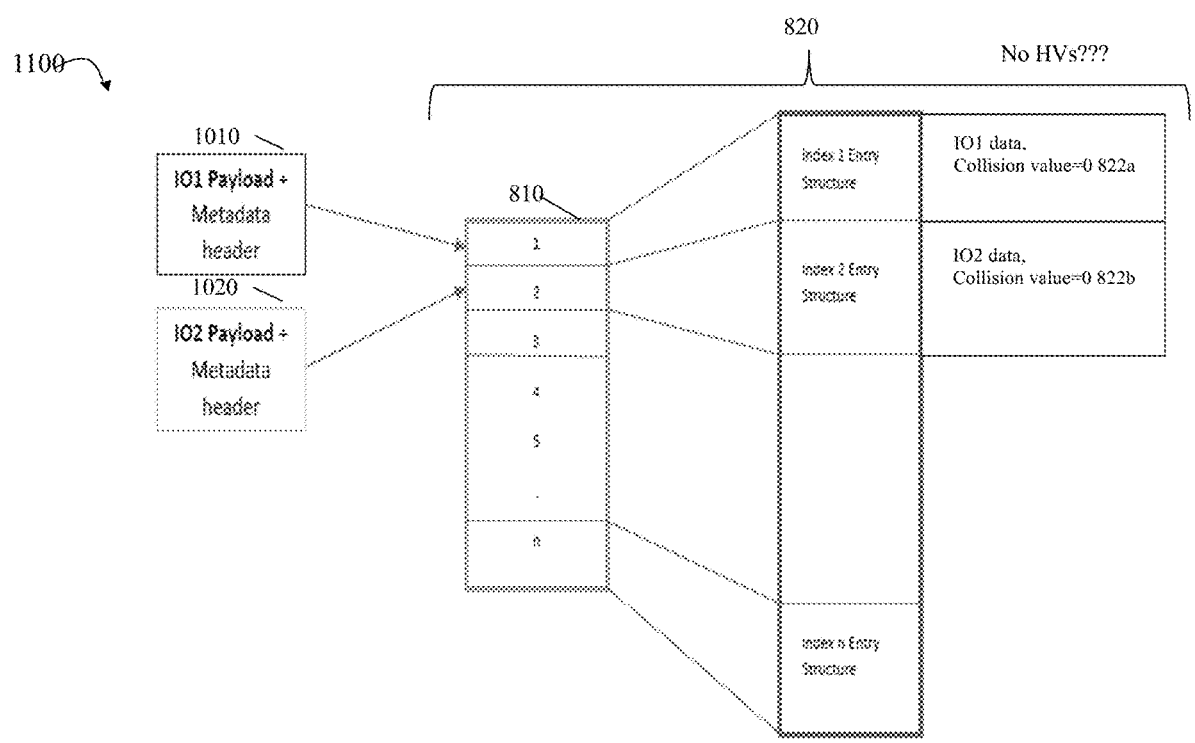

Now in connection with a second further example which builds on the first example just described in connection with FIGS. 11, 12 and 13, assume a third host write I/O, IO3, is received by the local system, where IO3 includes the same write I/O data payload as the second IO2 903.

Figure 14:
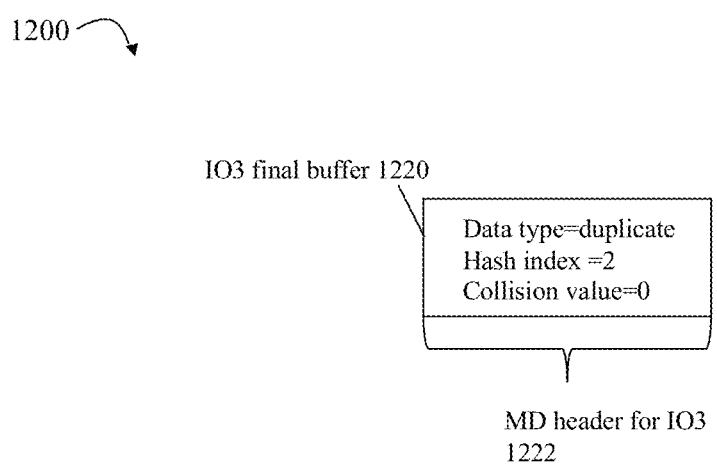

On the local (R1) system, processing is performed consistent with local system processing described above. The hash value for IO3 is calculated using the hash function. Since IO2 and IO3 have the same write data payload, the calculated hash values for IO2 and IO3 are the same (e.g., both have the same hash value HV2). Further, the hash value HV2 calculated for both IO2 and IO3 are mapped to the same hash index value of 2. Processing now compares the hash values of all hash entries for the index entry 2 as stored in the local system's hash table illustrated in FIG. 11. Since there is only a single IO2 entry 422b for the index 2, the entry 422b has a collision value=0. Processing on the local system determines that entry 422b has the same HV2 matching the calculated hash value for IO3 and generates final buffer 1220 for IO3 as illustrated in the example 1200 of FIG. 14. The final buffer 1220 for IO3 only includes the MD header 1222 and does not include any write I/O data payload since IO3 is a duplicate write I/O of IO2. Accordingly, the MD header 1222 includes a data type=duplicate, hash index=2, and a collision value=0. Thus, the hash index 2 and collision value=0 uniquely identify an existing entry in the remote system hash table which is expected to already include the copy of the write data payload for IO3. Additionally, the number of hits field 506 of the matching entry 822*b* is updated and incremented by 1 due to the match determined between the I/O write data payload of 822*b* and the write I/O data payload of the current write IO3.

The contents of the final buffer 1220 is transmitted from the local system to the remote system. The received data of the final buffer 1220 is then processed on the remote system as described above. Since the received MD header 1222 for IO3 includes a data type of duplicate, the remote system allocated a memory buffer with a size sufficient to hold the write data payload for IO3. In this example, this size is equivalent to the IO2 write data payload as stored in entry 822*b* whereby entry 822*b* is identified in the remote system hash table 820 as the entry having (e.g., mapped to) index value 2 and collision value 0. The IO2 write payload data as stored in entry 822*b* is copied from entry 822*b* into the allocated memory buffer. At this point, the remote system may perform processing to apply the write I/O, IO3, having the write I/O data payload as stored in the allocated memory buffer to the R2 device and thus replicate the write IO3 on the R2 device. Such processing may include storing the write I/O data payload for IO3 from the allocated memory buffer into cache whereby the cached write I/O data payload may be later destaged (e.g., written out) to physical non-volatile backend storage provisioned for the R2 device.

As seen from the above example, the techniques herein eliminated the need to transfer the write data payload for IO3 since it was previously transmitted to the remote system in connection with replication data provided from the local to the remote system for IO2 and whereby the hash table entry for IO2 is still included in the hash table.

Techniques herein include performing data deduplication in connection with replication data and replication processing. Techniques herein effectively minimize the number of times the redundant duplicate time is replicated across the network and reduces the network bandwidth usage. Techniques herein use hash table synchronization between hash tables of the local and remote systems whereby the duplicate data is retrieved from the remote system hash table for replication on the remote system and thus enables achieving greater performance of RDF replication systems. The techniques herein are computationally less expensive in comparison to other techniques of existing systems since the insertion, deletion and search operations of the hash table are O(1) time complexity. Furthermore, techniques herein provide an effective alternate solution to existing techniques such as data compression that may be used in connection with replication processing.

It should be noted that additional information for each write I/O operation may also be sent from the local to the remote system. For example, although not explicitly noted in particular examples and figures herein and consistent with other discussion herein, the write target address or location (e.g., LUN and logical address on the LUN being written to) may also be included in the information transmitted from the local to the remote system for each write operation What will now be described are flowcharts of processing that may be performed in an embodiment in accordance with techniques. The flowcharts of FIGS. 15 and 16 summarize processing described above.

Figure 15:
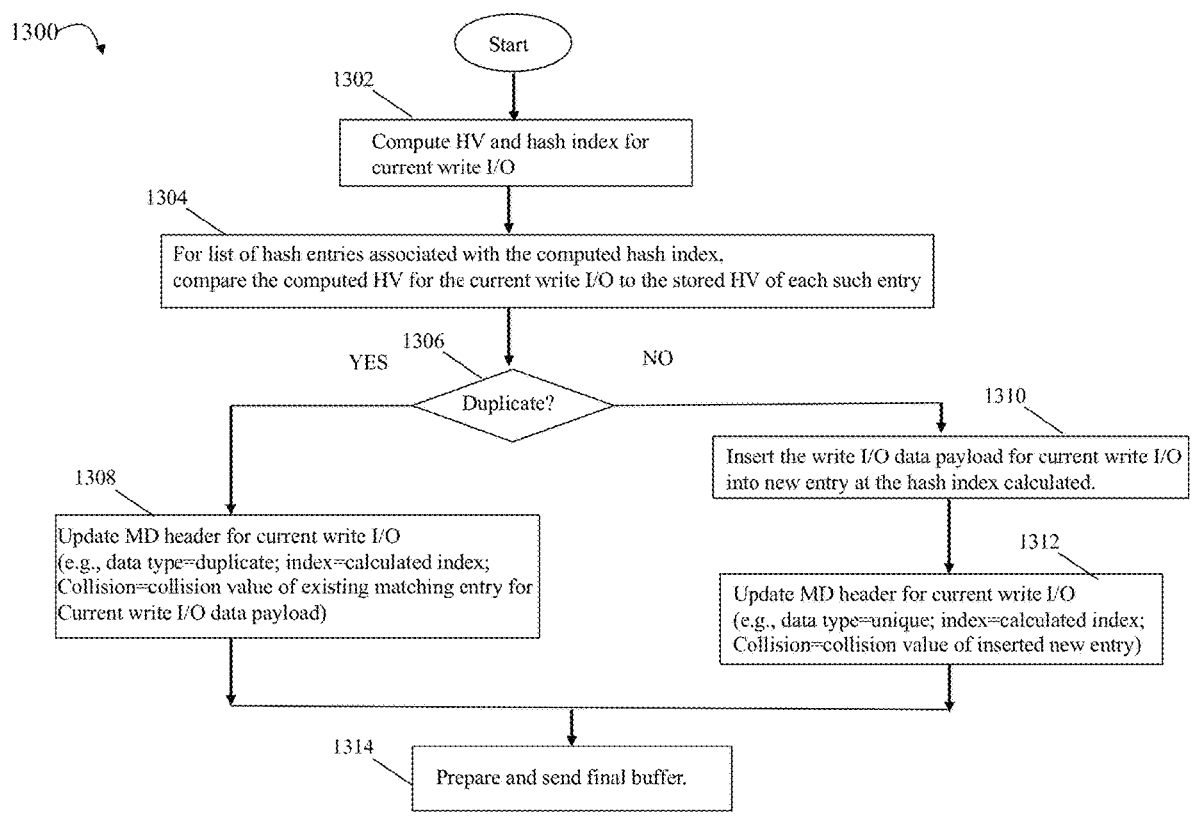
FIGS. 15 and 16 are flowcharts of processing steps that may be performed in an embodiment in accordance with techniques herein.
Figure 16:
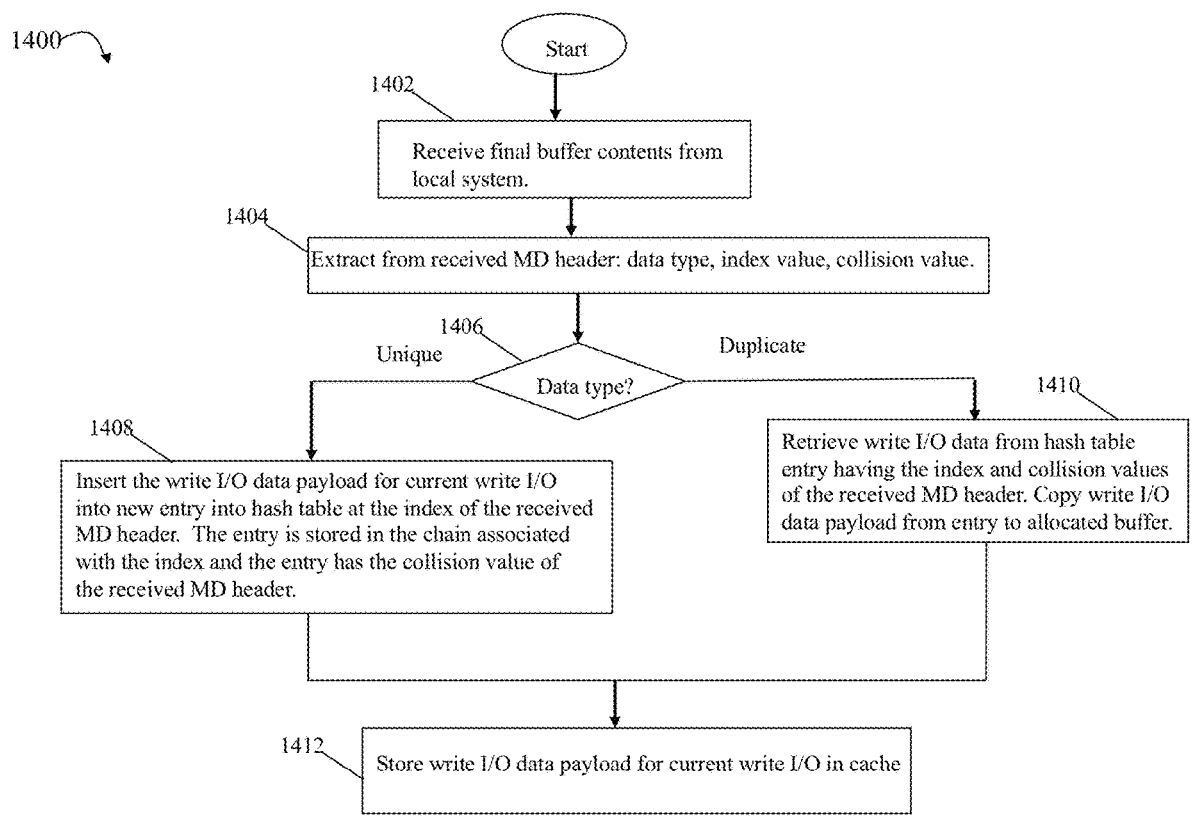

Referring to FIG. 15, shown is flowchart 1300 of processing steps that may be performed on the local or R1 data storage system in an embodiment in accordance with techniques herein. The processing of 1300 is with respect to a single host write I/O being replicated from the local or R1 system to the remote or R2 system. At step 1302, the hash value (HV) and hash index are computed for the current write I/O in accordance with the current write I/O data payload. From step 1302, control proceeds to step 1304. At step 1304, processing includes, for the list of hash entries associated with the computed hash index, compare the computed HV for the current write I/O to the stored HV of each such entry. At step 1306, a determination is made as to whether the hash table of the local system includes an existing entry matching the current write I/O (e.g., write I/O data payload of the current write I/O matches the stored write I/O data payload of an existing hash table entry). Step 1306 may include determining that there are no existing entries of stored write I/O data associated with the computed hash index, whereby there is no duplicate or matching entry in the hash table that matches the current write I/O. Step 1306 may include determining that there are one or more existing entries in the chain of entries associated with the computed hash index and none of the existing entries matches the current write I/O (e.g., whereby there is no duplicate or matching entry in the hash table having an HV that matches the HV of the current write I/O). Step 1306 may include determining that there are one or more existing entries in the chain of entries associated with the computed hash index and one of the existing entries matches the current write I/O (e.g., whereby there is a duplicate or matching entry in the hash table having an HV that matches the HV of the current write I/O).

If step 1306 determines that there is an existing duplicate entry in the local system table matching the current write I/O, control proceeds to step 1308. At step 1308, the MD header for the current write I/O is updated. In particular, step 1308 includes setting the data type of the MD header for the current write I/O to duplicate, index to the calculated hash index for the current write I/O, and collision to the collision value of the existing matching entry for the current write I/O data payload. From step 1306, control proceeds to step 1314 where the final buffer is prepared and send to the remote system. In this case, the final buffer includes the MD header for the write I/O but no write I/O payload data.

If step 1306 determines that there is no existing duplicate entry in the local system table matching the current write I/O, control proceeds to step 1310. At step 1310, a new entry is inserted into the local hash table for the current write I/O. The new entry is inserted at the hash index calculated as the next entry in the chain (e.g., using the next collision value in the chain where zero denotes the first entry in the chain). From step 1310, control proceeds to step 1312 where the MD header for the current write I/O is updated. In particular, step 1312 includes setting the data type of the MD header for the current write I/O to unique, index to the calculated hash index for the current write I/O, and collision to the collision value of the newly inserted entry for the current write I/O data payload. From step 1312, control proceeds to step 1314 where the final buffer is prepared and sent to the remote system. In this case, the final buffer includes the MD header for the write I/O and also the write I/O payload data.

Referring to FIG. 16, shown is a flowchart 1400 summarizing processing as may be performed on an R2 or remote data storage system in an embodiment in accordance with techniques herein. In step 1402, the remote data storage system receives the final buffer as transmitted from the local system. In step 1404, processing is performed to extract the received MD header fields from the received data including the data type, index value and collision value. At step 1406, a determination is made as to whether the data type is unique or duplicate.

If step 1406 determines that the data type is unique, control proceeds to step 1408. At step 1408, the write I/O data payload for the current write I/O is inserted into a new entry in the hash table at the index of the received MD header. The new entry is stored in the chain associated with the index and the entry has the collision value of the received MD header. From step 1408, control proceeds to step 1412 to store the write I/O data payload for the current write I/O in cache.

If step 1406 determines that the data type is duplicate, control proceeds to step 1410. At step 1410, the write I/O data payload for the current write I/O is retrieved from the existing entry of the remote system hash table having the index and collision values of the received MD header. Step 1410 includes copying the write I/O data payload from the entry to the allocated buffer. From step 1410, control proceeds to step 1412 to store the write I/O data payload for the current write I/O in cache.

An embodiment may implement the techniques herein using code executed by a processor. For example, an embodiment may implement the techniques herein using code which is executed by a processor of the data storage system, or more generally any other system. As will be appreciated by those skilled in the art, the code may be stored on the data storage system on a computer-readable medium having any one of a variety of different forms including volatile and nonvolatile, removable and non-removable media implemented in any method or technology for storage of information such as computer readable instructions, data structures, program modules or other data. Computer-readable media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing write operations comprising:
   receiving, at a first data storage array, a first write operation that writes first data to a first device of the first data storage array, wherein the first device is a first logical device that has storage provisioned from at least one non-volatile storage device of the first data storage array and that is configured for replication on a second device, wherein the second device is a second logical device of a second data storage array and the second logical device has storage provisioned from at least one non-volatile storage device of the second data storage array;
   performing first processing that determines whether the first data written by the first write operation is a duplicate of an existing entry in a first hash table of the first data storage array;
   responsive to determining the first data written by the first write operation is a duplicate of an existing entry in the first hash table, performing second processing comprising:
      preparing a final buffer including information used by the second data storage array in replicating the first write operation on the second device of the second data storage array, wherein the existing entry is included in a list of one or more entries associated with a first hash index of the first hash table, wherein the final buffer includes first metadata identifying the existing entry of the first hash table that is a duplicate of the first data of the first write operation, wherein the first metadata of the final buffer includes a first collision value denoting a position of the existing entry in the list of one or more entries associated with the first hash index;
   responsive to determining the first data written by the first write operation is unique and is not a duplicate of an existing entry in the first hash table, performing third processing comprising:
      inserting, into the first hash table, a first new entry that stores the first data written by the first write operation, wherein the first new entry is included in the list of one or more entries associated with the first hash index; and
      preparing the final buffer including information used by the second data storage array in replicating the first write operation on the second device of the second data storage array, wherein the final buffer includes second metadata used by the second data storage array in creating another new entry in a second hash table on the second data storage array, wherein the another new entry corresponds to the first new entry of the first hash table of the first data storage array, wherein the second metadata of the final buffer includes a second collision value denoting a position of the first new entry in the list;
   transmitting the final buffer from the first data storage array to the second data storage array; and
   determining that the first hash table is full whereby each hash index of the first hash table is associated with at least one entry such that a next unique data block specified by a received write operation will result in a hash collision in the first hash table for a hash index generated from the next unique data block, thereby requiring a new entry for the next unique data block being associated with the hash index;
   responsive to determining the first hash table is full, removing a set of one or more entries from the first hash table wherein each entry of the set has an associated count that is less than other associated counts of other entries of the first hash table not included in the set, where the associated count for said each entry of the first hash table denotes a number of times stored data associated with said each entry has been detected as a duplicate; and
   updating the second hash table to remove a corresponding entry for each entry of the first hash table removed by said removing.

2. The method of claim 1, wherein the first processing includes:
   computing a first hash value for the first data written by the first write operation;
   computing the first hash index for the first hash value; and
   determining whether the first hash index of the first hash table has the existing entry that is a duplicate of the first data written by the first write operation.

3. The method of claim 2, wherein said determining whether the first hash index of the first hash table has the existing entry that is a duplicate of the first data written by the first write operation includes:
   comparing the first hash value to another hash value of the existing entry; and responsive to the first hash value matching the another hash value, determining the existing entry is a duplicate of the first data written by the first write operation.

4. The method of claim 3, wherein the first data of the first write operation is a duplicate and the final buffer includes the first metadata, that identifies the existing entry of the first hash table that is a duplicate of the first data of the first write operation, wherein the first metadata includes a data type indicating the first write operation is a duplicate, the first hash index of the existing entry, and the first collision value of the existing entry, wherein the first hash index and the first collision value are used on the second data storage array to uniquely identify an existing corresponding entry of the second hash table of the second data storage array that includes the first data of the first write operation.

5. The method of claim 4, wherein the final buffer does not include the first data written by the first write operation.

6. The method of claim 3, wherein the first data of the first write operation is unique and is not a duplicate of an existing entry in the first hash table, wherein the third processing inserts the first new entry in the list of one or more entries associated with the first hash index, and wherein the first new entry has the second collision value.

7. The method of claim 6, wherein the second metadata of the final buffer includes a data type indicating the first write operation is unique and is not a duplicate, the first hash index, and the second collision value, and the final buffer includes the first data written by the first write operation.

8. The method of claim 7, wherein the second data storage array inserts the another new entry in the second hash table of the second data storage array, the another new entry being included in a list of one or more entries associated with the first hash index in the second hash table, and wherein the another new entry has the second collision value.

9. The method of claim 1, wherein the first device is configured for synchronous replication on the second device of the second data storage array.

10. The method of claim 1, wherein the first device is configured for asynchronous replication on the second device of the second data storage array.

11. The method of claim 1, further comprising:
writing the first data to the first device of the first data storage array; and
upon receiving the final buffer on the second data storage array, performing processing to use information of the final buffer to write the first data on the second device of the second data storage array.

12. A system comprising:
one or more processors; and
a memory comprising code stored thereon that, when executed by at least a first of the one or more processors, performs a method of processing write operations comprising:
receiving, at a first data storage array, a first write operation that writes first data to a first device of the first data storage array, wherein the first device is a first logical device that has storage provisioned from at least one non-volatile storage device of the first data storage array and that is configured for replication on a second device, wherein the second device is a second logical device of a second data storage array and the second logical device has storage provisioned from at least one non-volatile storage device of the second data storage array;
performing first processing that determines whether the first data written by the first write operation is a duplicate of an existing entry in a first hash table of the first data storage array;
responsive to determining the first data written by the first write operation is a duplicate of an existing entry in the first hash table, performing second processing comprising:
preparing a final buffer including information used by the second data storage array in replicating the first write operation on the second device of the second data storage array, wherein the existing entry is included in a list of one or more entries associated with a first hash index of the first hash table, wherein the final buffer includes first metadata identifying the existing entry of the first hash table that is a duplicate of the first data of the first write operation, wherein the first metadata of the final buffer includes a first collision value denoting a position of the existing entry in the list of one or more entries associated with the first hash index;
responsive to determining the first data written by the first write operation is unique and is not a duplicate of an existing entry in the first hash table, performing third processing comprising:
inserting, into the first hash table, a first new entry that stores the first data written by the first write operation, wherein the first new entry is included in the list of one or more entries associated with the first hash index; and
preparing the final buffer including information used by the second data storage array in replicating the first write operation on the second device of the second data storage array, wherein the final buffer includes second metadata used by the second data storage array in creating another new entry in a second hash table on the second data storage array, wherein the another new entry corresponds to the first new entry of the first hash table of the first data storage array, wherein the second metadata of the final buffer includes a second collision value denoting a position of the first new entry in the list;
transmitting the final buffer from the first data storage array to the second data storage array; and
determining that the first hash table is full whereby each hash index of the first hash table is associated with at least one entry such that a any next unique data block specified by a received write operation will result in a hash collision in the first hash table for a hash index generated from the next unique data block, thereby requiring a new entry for the next unique data block being associated with the hash index;
responsive to determining the first hash table is full, removing a set of one or more entries from the first hash table wherein each entry of the set has an associated count that is less than other associated counts of other entries of the first hash table not included in the set, where the associated count for said each entry of the first hash table denotes a number of times stored data associated with said each entry has been detected as a duplicate; and
updating the second hash table to remove a corresponding entry for each entry of the first hash table removed by said removing.

13. A computer readable medium comprising code stored thereon that performs a method of processing write operations comprising:

receiving, at a first data storage array, a first write operation that writes first data to a first device of the first data storage array, wherein the first device is a first logical device that has storage provisioned from at least one non-volatile storage device of the first data storage array and that is configured for replication on a second device, wherein the second device is a second logical device of a second data storage array and the second logical device has storage provisioned from at least one non-volatile storage device of the second data storage array;

performing first processing that determines whether the first data written by the first write operation is a duplicate of an existing entry in a first hash table of the first data storage array;

responsive to determining the first data written by the first write operation is a duplicate of an existing entry in the first hash table, performing second processing comprising:

preparing a final buffer including information used by the second data storage array in replicating the first write operation on the second device of the second data storage array, wherein the existing entry is included in a list of one or more entries associated with a first hash index of the first hash table, wherein the final buffer includes first metadata identifying the existing entry of the first hash table that is a duplicate of the first data of the first write operation, wherein the first metadata of the final buffer includes a first collision value denoting a position of the existing entry in the list of one or more entries associated with the first hash index;

responsive to determining the first data written by the first write operation is unique and is not a duplicate of an existing entry in the first hash table, performing third processing comprising:

inserting, into the first hash table, a first new entry that stores the first data written by the first write operation, wherein the first new entry is included in the list of one or more entries associated with the first hash index; and preparing the final buffer including information used by the second data storage array in replicating the first write operation on the second device of the second data storage array, wherein the final buffer includes second metadata used by the second data storage array in creating another new entry in a second hash table on the second data storage array, wherein the another new entry corresponds to the first new entry of the first hash table of the first data storage array, wherein the second metadata of the final buffer includes a second collision value denoting a position of the first new entry in the list;

transmitting the final buffer from the first data storage array to the second data storage array; and determining that the first hash table is full whereby each hash index of the first hash table is associated with at least one entry such that a next unique data block specified by a received write operation will result in a hash collision in the first hash table for a hash index generated from the next unique data block, thereby requiring a new entry for the next unique data block being associated with the hash index;

responsive to determining the first hash table is full, removing a set of one or more entries from the first hash table wherein each entry of the set has an associated count that is less than other associated counts of other entries of the first hash table not included in the set, where the associated count for said each entry of the first hash table denotes a number of times stored data associated with said each entry has been detected as a duplicate; and updating the second hash table to remove a corresponding entry for each entry of the first hash table removed by said removing.

14. The computer readable medium of claim 13, wherein the first processing includes:

computing a first hash value for the first data written by the first write operation;

computing the first hash index for the first hash value; and determining whether the first hash index of the first hash table has the existing entry that is a duplicate of the first data written by the first write operation.

15. The computer readable medium of claim 14, wherein said determining whether the first hash index of the first hash table has the existing entry that is a duplicate of the first data written by the first write operation includes:

comparing the first hash value to another hash value of the existing entry; and responsive to the first hash value matching the another hash value, determining the existing entry is a duplicate of the first data written by the first write operation.

16. The computer readable medium of claim 15, wherein the first data of the first write operation is a duplicate and the final buffer includes the first metadata, that identifies the existing entry of the first hash table that is a duplicate of the first data of the first write operation, wherein the first metadata includes a data type indicating the first write operation is a duplicate, the first hash index of the existing entry, and the first collision value of the existing entry, wherein the first hash index and the first collision value are used on the second data storage array to uniquely identify an existing corresponding entry of the second hash table of the second data storage array that includes the first data of the first write operation.

17. The computer readable medium of claim 16, wherein the final buffer does not include the first data written by the first write operation.

18. The computer readable medium of claim 15, wherein the first data of the first write operation is unique and is not a duplicate of an existing entry in the first hash table, wherein the third processing inserts the first new entry in the list of one or more entries associated with the first hash index, and wherein the first new entry has the second collision value.

19. The computer readable medium of claim 18, wherein the second metadata of the final buffer includes a data type indicating the first write operation is unique and is not a duplicate, the first hash index, and the second collision value, and the final buffer includes the first data written by the first write operation.

20. The computer readable medium of claim 19, wherein the second data storage array inserts the another new entry in the second hash table of the second data storage array, the another new entry being included in a list of one or more entries associated with the first hash index in the second hash table, and wherein the another new entry has the second collision value.

* * * * *